United States Patent
Lindemann

(10) Patent No.: US 9,577,999 B1
(45) Date of Patent: Feb. 21, 2017

(54) ENHANCED SECURITY FOR REGISTRATION OF AUTHENTICATION DEVICES

(71) Applicant: NOK NOK LABS, INC., Palo Alto, CA (US)

(72) Inventor: Rolf Lindemann, Steele (DE)

(73) Assignee: NOK NOK LABS, INC., Palo Alto, CA (US)

( * ) Notice: Subject to any disclaimer, the term of this patent is extended or adjusted under 35 U.S.C. 154(b) by 0 days.

(21) Appl. No.: 14/268,619

(22) Filed: May 2, 2014

(51) Int. Cl.
  *H04L 29/06* (2006.01)
  *H04L 9/32* (2006.01)
(52) U.S. Cl.
  CPC ............. *H04L 63/08* (2013.01); *H04L 9/3247* (2013.01); *H04L 63/0823* (2013.01)
(58) Field of Classification Search
  CPC ..... H04L 63/08; H04L 9/3247; H04L 63/0823
  USPC ........................................................ 713/176
  See application file for complete search history.

(56) References Cited

U.S. PATENT DOCUMENTS

| | | | |
|---|---|---|---|
| 5,280,527 A | 1/1994 | Gullman et al. |
| 5,764,789 A | 6/1998 | Pare, Jr. et al. |
| 6,088,450 A | 7/2000 | Davis et al. |
| 6,178,511 B1 | 1/2001 | Cohen et al. |
| 6,377,691 B1 | 4/2002 | Swift et al. |
| 6,618,806 B1 | 9/2003 | Brown et al. |
| 6,751,733 B1 | 6/2004 | Nakamura et al. |
| 6,938,156 B2 | 8/2005 | Wheeler et al. |
| 7,194,763 B2 | 3/2007 | Potter et al. |
| 7,263,717 B1 | 8/2007 | Boydstun et al. |
| 7,444,368 B1 | 10/2008 | Wong et al. |
| 7,487,357 B2 | 2/2009 | Smith et al. |
| 7,512,567 B2 | 3/2009 | Bemmel et al. |
| 7,698,565 B1 | 4/2010 | Bjorn et al. |
| 7,865,937 B1 | 1/2011 | White et al. |
| 7,941,669 B2 | 5/2011 | Foley et al. |
| 8,060,922 B2 | 11/2011 | Crichton |
| 8,166,531 B2 | 4/2012 | Suzuki |
| 8,245,030 B2 | 8/2012 | Lin |
| 8,284,043 B2 | 10/2012 | Judd et al. |
| 8,291,468 B1 | 10/2012 | Chickering |
| 8,353,016 B1 | 1/2013 | Pravetz et al. |

(Continued)

FOREIGN PATENT DOCUMENTS

| | | |
|---|---|---|
| WO | 2005003985 A1 | 1/2005 |
| WO | 2013082190 A1 | 6/2013 |

OTHER PUBLICATIONS

Notification of Transmittal or Search Report and Written Opinion from PCT/US2015/028927, mailed Jul. 30, 2015, 1 page.

(Continued)

*Primary Examiner* — Michael S McNally
(74) *Attorney, Agent, or Firm* — Nicholson De Vos Webster & Elliott LLP

(57) ABSTRACT

A system, apparatus, method, and machine readable medium are described for enhanced security during registration. For example, one embodiment of a method comprises: receiving a request at a relying party to register an authenticator; sending a code from the user to the relying party through an authenticated out-of-band communication channel; and verifying the identity of the user using the code and responsively registering the authenticator in response to a positive verification.

23 Claims, 15 Drawing Sheets

(56) References Cited

U.S. PATENT DOCUMENTS

| | | | |
|---|---|---|---|
| 8,359,045 B1 | 1/2013 | Hopkins, III | |
| 8,458,465 B1 | 6/2013 | Stern et al. | |
| 8,489,506 B2 | 7/2013 | Hammad et al. | |
| 8,516,552 B2 | 8/2013 | Raleigh | |
| 8,555,340 B2 | 10/2013 | Potter et al. | |
| 8,561,152 B2 | 10/2013 | Novak et al. | |
| 8,584,224 B1 | 11/2013 | Pei et al. | |
| 8,607,048 B2 | 12/2013 | Nogawa | |
| 8,646,060 B1* | 2/2014 | Ben Ayed | H04L 63/0853 726/9 |
| 8,713,325 B2 | 4/2014 | Ganesan | |
| 8,719,905 B2 | 5/2014 | Ganesan | |
| 8,776,180 B2 | 7/2014 | Kumar et al. | |
| 8,856,541 B1 | 10/2014 | Chaudhury et al. | |
| 8,949,978 B1 | 2/2015 | Lin et al. | |
| 8,958,599 B1 | 2/2015 | Starner | |
| 8,978,117 B2 | 3/2015 | Bentley et al. | |
| 9,015,482 B2 | 4/2015 | Baghdasaryan et al. | |
| 9,032,485 B2 | 5/2015 | Chu et al. | |
| 9,083,689 B2 | 7/2015 | Lindemann et al. | |
| 9,172,687 B2 | 10/2015 | Baghdasaryan et al. | |
| 9,396,320 B2 | 7/2016 | Lindemann | |
| 2002/0073316 A1 | 6/2002 | Collins et al. | |
| 2002/0073320 A1 | 6/2002 | Rinkevich et al. | |
| 2002/0087894 A1 | 7/2002 | Foley et al. | |
| 2002/0112170 A1 | 8/2002 | Foley et al. | |
| 2002/0174344 A1 | 11/2002 | Ting | |
| 2002/0174348 A1 | 11/2002 | Ting | |
| 2003/0055792 A1 | 3/2003 | Kinoshita et al. | |
| 2003/0065805 A1 | 4/2003 | Barnes | |
| 2003/0084300 A1 | 5/2003 | Koike | |
| 2003/0087629 A1 | 5/2003 | Juitt et al. | |
| 2003/0115142 A1 | 6/2003 | Brickell et al. | |
| 2003/0135740 A1 | 7/2003 | Talmor et al. | |
| 2003/0152252 A1 | 8/2003 | Kondo et al. | |
| 2003/0226036 A1 | 12/2003 | Bivens et al. | |
| 2003/0236991 A1 | 12/2003 | Letsinger | |
| 2004/0101170 A1 | 5/2004 | Tisse et al. | |
| 2004/0123153 A1 | 6/2004 | Wright et al. | |
| 2005/0021964 A1 | 1/2005 | Bhatnagar et al. | |
| 2005/0097320 A1 | 5/2005 | Golan et al. | |
| 2005/0160052 A1* | 7/2005 | Schneider et al. | 705/67 |
| 2005/0223236 A1 | 10/2005 | Yamada et al. | |
| 2005/0278253 A1 | 12/2005 | Meek et al. | |
| 2006/0026671 A1 | 2/2006 | Potter et al. | |
| 2006/0029062 A1 | 2/2006 | Rao et al. | |
| 2006/0156385 A1 | 7/2006 | Chiviendacz et al. | |
| 2006/0282670 A1 | 12/2006 | Karchov | |
| 2007/0005988 A1 | 1/2007 | Zhang et al. | |
| 2007/0077915 A1 | 4/2007 | Black et al. | |
| 2007/0088950 A1 | 4/2007 | Wheeler et al. | |
| 2007/0100756 A1 | 5/2007 | Varma | |
| 2007/0106895 A1 | 5/2007 | Huang et al. | |
| 2007/0107048 A1 | 5/2007 | Halls et al. | |
| 2007/0118883 A1 | 5/2007 | Potter et al. | |
| 2007/0165625 A1 | 7/2007 | Eisner et al. | |
| 2007/0168677 A1 | 7/2007 | Kudo et al. | |
| 2007/0169182 A1 | 7/2007 | Wolfond et al. | |
| 2007/0198435 A1 | 8/2007 | Siegal et al. | |
| 2007/0239980 A1 | 10/2007 | Funayama | |
| 2007/0278291 A1 | 12/2007 | Rans et al. | |
| 2007/0286130 A1 | 12/2007 | Shao et al. | |
| 2008/0005562 A1* | 1/2008 | Sather et al. | 713/168 |
| 2008/0025234 A1 | 1/2008 | Zhu et al. | |
| 2008/0034207 A1 | 2/2008 | Cam-Winget et al. | |
| 2008/0046334 A1 | 2/2008 | Lee et al. | |
| 2008/0046984 A1 | 2/2008 | Bohmer et al. | |
| 2008/0049983 A1 | 2/2008 | Miller et al. | |
| 2008/0086759 A1 | 4/2008 | Colson | |
| 2008/0134311 A1 | 6/2008 | Medvinsky et al. | |
| 2008/0141339 A1 | 6/2008 | Gomez et al. | |
| 2008/0172725 A1 | 7/2008 | Fujii et al. | |
| 2008/0235801 A1 | 9/2008 | Soderberg et al. | |
| 2008/0271150 A1 | 10/2008 | Boerger et al. | |
| 2008/0289019 A1 | 11/2008 | Lam | |
| 2008/0313719 A1 | 12/2008 | Kaliski, Jr. et al. | |
| 2008/0320308 A1 | 12/2008 | Kostiainen et al. | |
| 2009/0049510 A1 | 2/2009 | Zhang et al. | |
| 2009/0064292 A1 | 3/2009 | Carter et al. | |
| 2009/0089870 A1 | 4/2009 | Wahl | |
| 2009/0100269 A1 | 4/2009 | Naccache | |
| 2009/0116651 A1 | 5/2009 | Liang et al. | |
| 2009/0133113 A1 | 5/2009 | Schneider | |
| 2009/0138724 A1 | 5/2009 | Chiou et al. | |
| 2009/0138727 A1 | 5/2009 | Campello de Souza | |
| 2009/0158425 A1 | 6/2009 | Chan et al. | |
| 2009/0183003 A1 | 7/2009 | Haverinen | |
| 2009/0193508 A1 | 7/2009 | Brenneman et al. | |
| 2009/0199264 A1 | 8/2009 | Lang | |
| 2009/0204964 A1 | 8/2009 | Foley et al. | |
| 2009/0235339 A1 | 9/2009 | Mennes et al. | |
| 2009/0300714 A1 | 12/2009 | Ahn | |
| 2009/0307139 A1 | 12/2009 | Mardikar et al. | |
| 2009/0327131 A1 | 12/2009 | Beenau et al. | |
| 2009/0328197 A1* | 12/2009 | Newell | G06F 21/36 726/18 |
| 2010/0010932 A1 | 1/2010 | Law et al. | |
| 2010/0023454 A1 | 1/2010 | Exton et al. | |
| 2010/0029300 A1 | 2/2010 | Chen | |
| 2010/0042848 A1 | 2/2010 | Rosener | |
| 2010/0062744 A1 | 3/2010 | Ibrahim | |
| 2010/0070424 A1 | 3/2010 | Monk | |
| 2010/0082484 A1 | 4/2010 | Erhart et al. | |
| 2010/0083000 A1 | 4/2010 | Kesanupalli | |
| 2010/0105427 A1 | 4/2010 | Gupta | |
| 2010/0107222 A1 | 4/2010 | Glasser | |
| 2010/0169650 A1 | 7/2010 | Brickell et al. | |
| 2010/0175116 A1 | 7/2010 | Gum | |
| 2010/0186072 A1 | 7/2010 | Kumar | |
| 2010/0192209 A1 | 7/2010 | Steeves et al. | |
| 2010/0223663 A1 | 9/2010 | Morimoto et al. | |
| 2010/0242088 A1 | 9/2010 | Thomas | |
| 2010/0325664 A1 | 12/2010 | Kang | |
| 2010/0325684 A1 | 12/2010 | Grebenik et al. | |
| 2010/0325711 A1 | 12/2010 | Etchegoyen | |
| 2011/0004933 A1 | 1/2011 | Dickinson et al. | |
| 2011/0022835 A1 | 1/2011 | Schibuk | |
| 2011/0047608 A1 | 2/2011 | Levenberg | |
| 2011/0071841 A1 | 3/2011 | Fomenko et al. | |
| 2011/0078443 A1 | 3/2011 | Greenstein et al. | |
| 2011/0082801 A1 | 4/2011 | Baghdasaryan et al. | |
| 2011/0083016 A1 | 4/2011 | Kesanupalli et al. | |
| 2011/0107087 A1 | 5/2011 | Lee et al. | |
| 2011/0167154 A1 | 7/2011 | Bush et al. | |
| 2011/0167472 A1 | 7/2011 | Evans et al. | |
| 2011/0191200 A1 | 8/2011 | Bayer et al. | |
| 2011/0197267 A1 | 8/2011 | Gravel et al. | |
| 2011/0219427 A1 | 9/2011 | Hito et al. | |
| 2011/0225431 A1 | 9/2011 | Stufflebeam, Jr. et al. | |
| 2011/0228330 A1 | 9/2011 | Nogawa | |
| 2011/0231911 A1 | 9/2011 | White et al. | |
| 2011/0246766 A1 | 10/2011 | Orsini et al. | |
| 2011/0265159 A1 | 10/2011 | Ronda et al. | |
| 2011/0279228 A1 | 11/2011 | Kumar | |
| 2011/0280402 A1 | 11/2011 | Ibrahim et al. | |
| 2011/0296518 A1 | 12/2011 | Faynberg et al. | |
| 2011/0307949 A1 | 12/2011 | Ronda et al. | |
| 2011/0314549 A1 | 12/2011 | Song et al. | |
| 2012/0018506 A1 | 1/2012 | Hammad et al. | |
| 2012/0023568 A1 | 1/2012 | Cha et al. | |
| 2012/0046012 A1 | 2/2012 | Forutanpour et al. | |
| 2012/0075062 A1 | 3/2012 | Osman et al. | |
| 2012/0084566 A1 | 4/2012 | Chin et al. | |
| 2012/0102553 A1 | 4/2012 | Hsueh et al. | |
| 2012/0124639 A1 | 5/2012 | Shaikh et al. | |
| 2012/0124651 A1 | 5/2012 | Ganesan et al. | |
| 2012/0144461 A1 | 6/2012 | Rathbun | |
| 2012/0159577 A1 | 6/2012 | Belinkiy et al. | |
| 2012/0191979 A1 | 7/2012 | Feldbau | |
| 2012/0204032 A1 | 8/2012 | Wilkins et al. | |
| 2012/0210135 A1 | 8/2012 | Panchapakesan et al. | |
| 2012/0249298 A1 | 10/2012 | Sovio et al. | |
| 2012/0272056 A1* | 10/2012 | Ganesan | 713/156 |
| 2012/0278873 A1 | 11/2012 | Calero et al. | |

(56) References Cited

U.S. PATENT DOCUMENTS

| | | |
|---|---|---|
| 2012/0291114 A1 | 11/2012 | Poliashenko et al. |
| 2012/0313746 A1 | 12/2012 | Rahman et al. |
| 2012/0317297 A1 | 12/2012 | Bailey |
| 2013/0042327 A1 | 2/2013 | Chow |
| 2013/0046976 A1 | 2/2013 | Rosati et al. |
| 2013/0046991 A1 | 2/2013 | Lu et al. |
| 2013/0054967 A1 | 2/2013 | Davoust et al. |
| 2013/0061055 A1 | 3/2013 | Schibuk |
| 2013/0067546 A1 | 3/2013 | Thavasi et al. |
| 2013/0073859 A1 | 3/2013 | Carlson et al. |
| 2013/0086669 A1 | 4/2013 | Sondhi et al. |
| 2013/0090939 A1 | 4/2013 | Robinson et al. |
| 2013/0097682 A1 | 4/2013 | Zeljkovic et al. |
| 2013/0104187 A1 | 4/2013 | Weidner |
| 2013/0104190 A1 | 4/2013 | Simske et al. |
| 2013/0119130 A1 | 5/2013 | Braams |
| 2013/0124285 A1 | 5/2013 | Pravetz et al. |
| 2013/0125197 A1 | 5/2013 | Pravetz et al. |
| 2013/0125222 A1 | 5/2013 | Pravetz et al. |
| 2013/0133049 A1 | 5/2013 | Peirce |
| 2013/0133054 A1 | 5/2013 | Davis et al. |
| 2013/0144785 A1 | 6/2013 | Karpenko et al. |
| 2013/0159413 A1 | 6/2013 | Davis et al. |
| 2013/0159716 A1 | 6/2013 | Buck et al. |
| 2013/0160083 A1 | 6/2013 | Schrix et al. |
| 2013/0167196 A1 | 6/2013 | Spencer et al. |
| 2013/0219456 A1 | 8/2013 | Sharma et al. |
| 2013/0227646 A1 | 8/2013 | Haggerty et al. |
| 2013/0239173 A1 | 9/2013 | Dispensa |
| 2013/0318343 A1 | 11/2013 | Bjarnason et al. |
| 2013/0337777 A1 | 12/2013 | Deutsch et al. |
| 2014/0007215 A1 | 1/2014 | Romano et al. |
| 2014/0013422 A1 | 1/2014 | Janus et al. |
| 2014/0033271 A1 | 1/2014 | Barton et al. |
| 2014/0040987 A1 | 2/2014 | Haugsnes |
| 2014/0044265 A1 | 2/2014 | Kocher et al. |
| 2014/0047510 A1 | 2/2014 | Belton et al. |
| 2014/0066015 A1 | 3/2014 | Aissi |
| 2014/0068746 A1 | 3/2014 | Gonzalez |
| 2014/0075516 A1 | 3/2014 | Chermside |
| 2014/0089243 A1 | 3/2014 | Oppenheimer |
| 2014/0096182 A1 | 4/2014 | Smith |
| 2014/0101439 A1 | 4/2014 | Pettigrew et al. |
| 2014/0109174 A1 | 4/2014 | Barton et al. |
| 2014/0115702 A1 | 4/2014 | Li et al. |
| 2014/0130127 A1 | 5/2014 | Toole et al. |
| 2014/0137191 A1 | 5/2014 | Goldsmith et al. |
| 2014/0164776 A1 | 6/2014 | Hook et al. |
| 2014/0173754 A1 | 6/2014 | Barbir |
| 2014/0188770 A1 | 7/2014 | Agrafioti et al. |
| 2014/0189350 A1 | 7/2014 | Baghdasaryan et al. |
| 2014/0189360 A1 | 7/2014 | Baghdasaryan et al. |
| 2014/0189779 A1 | 7/2014 | Baghdasaryan |
| 2014/0189791 A1 | 7/2014 | Lindemann et al. |
| 2014/0189807 A1 | 7/2014 | Cahill et al. |
| 2014/0189808 A1 | 7/2014 | Mahaffey et al. |
| 2014/0189828 A1 | 7/2014 | Baghdasaryan et al. |
| 2014/0189835 A1 | 7/2014 | Umerley |
| 2014/0201809 A1 | 7/2014 | Choyi et al. |
| 2014/0230032 A1 | 8/2014 | Duncan |
| 2014/0245391 A1 | 8/2014 | Adenuga |
| 2014/0250523 A1 | 9/2014 | Savvides et al. |
| 2014/0258125 A1 | 9/2014 | Gerber et al. |
| 2014/0258711 A1 | 9/2014 | Brannon |
| 2014/0282868 A1 | 9/2014 | Sheller et al. |
| 2014/0282945 A1 | 9/2014 | Smith et al. |
| 2014/0282965 A1 | 9/2014 | Sambamurthy et al. |
| 2014/0289117 A1 | 9/2014 | Baghdasaryan |
| 2014/0289820 A1 | 9/2014 | Lindemann et al. |
| 2014/0289833 A1 | 9/2014 | Briceno et al. |
| 2014/0298419 A1 | 10/2014 | Boubez et al. |
| 2015/0046340 A1 | 2/2015 | Dimmick |
| 2015/0180869 A1 | 6/2015 | Verma |
| 2015/0269050 A1 | 9/2015 | Filimonov et al. |
| 2015/0326529 A1 | 11/2015 | Morita |
| 2015/0381580 A1 | 12/2015 | Graham, III et al. |
| 2016/0087952 A1 | 3/2016 | Tartz et al. |

OTHER PUBLICATIONS

International Search Report from PCT/US2015/028927, mailed Jul. 30, 2015, 3 pages.

Written Opinion from PCT/US2015/028927, mailed Jul. 30, 2015, 8 pages.

Notice of Allowance from U.S. Appl. No. 14/145,533, mailed Sep. 14, 2015, 13 pages.

Notice of Allowance from U.S. Appl. No. 14/145,607, mailed Feb. 1, 2016, 28 pages.

Notice of Allowance from U.S. Appl. No. 14/145,607, mailed Sep. 2, 2015, 19 pages.

Notice of Allowance from U.S. Appl. No. 14/268,686, mailed Apr. 18, 2016, 16 pages.

Notice of Allowance from U.S. Appl. No. 14/268,686, mailed Jul. 8, 2016, 4 pages.

Notice of Allowance from U.S. Appl. No. 14/268,686, mailed Mar. 30, 2016, 38 pages.

Notice of Allowance from U.S. Appl. No. 14/268,686, mailed Nov. 5, 2015, 23 pages.

Notice of Allowance from U.S. Appl. No. 14/448,641, mailed Jun. 7, 2016, 13 pages.

Notice of Allowance from U.S. Appl. No. 14/448,697, mailed Jan. 14, 2016, 23 pages.

Notice of Allowance from U.S. Appl. No. 14/448,697, mailed May 20, 2016, 14 pages.

Notice of Allowance from U.S. Appl. No. 14/448,697, mailed Sep. 15, 2015, 14 pages.

Notification Concerning Transmittal of International Preliminary Report on Patentability for Application No. PCT/US14/39627, mailed on Dec. 10, 2015, 8 pages.

Notification of Transmittal of the International Search Report and the Written Opinion from counterpart Patent cooperation Treaty Application No. PCT/US13/77888, mailed Aug. 4, 2014, 10 pages.

Notification of Transmittal of the International Search Report and the Written Opinion from counterpart Patent cooperation Treaty Application No. PCT/US14/31344, mailed Nov. 3, 2014, 16 pages.

Notification of Transmittal of the International Search Report and the Written Opinion from counterpart Patent cooperation Treaty Application No. PCT/US14/39627, mailed Oct. 16, 2014, 10 pages.

Notification of Transmittal of the International Search Report and the Written Opinion from counterpart Patent cooperation Treaty Application No. PCT/US15/50348, mailed Dec. 22, 2015, 9 pages.

Notification of Transmittal of the International Search Report and the Written Opinion from counterpart Patent cooperation Treaty Application No. PCT/US2015/028924, mailed Jul. 30, 2015, 10 pages.

Notification of Transmittal of the International Search Report and the Written Opinion from counterpart Patent cooperation Treaty Application No. PCT/US2015/042786, mailed Oct. 16, 2015, 8 pages.

Notification of Transmittal of the International Search Report and the Written Opinion from counterpart Patent cooperation Treaty Application No. PCT/US2015/042799, mailed Oct. 16, 2015, 8 pages.

Notification of Transmittal of the International Search Report and the Written Opinion from counterpart Patent cooperation Treaty Application No. PCT/US2015/042870, mailed Oct. 30, 2015, 9 pages.

Notification of Transmittal of the International Search Report and the Written Opinion from counterpart Patent cooperation Treaty Application No. PCT/US2015/42783, mailed Oct. 19, 2015, 13 pages.

Notification of Transmittal of the International Search Report and the Written Opinion from counterpart Patent cooperation Treaty Application No. PCT/US2015/42827, mailed Oct. 30, 2015, 9 pages.

(56) References Cited

OTHER PUBLICATIONS

Pan G., et al., "Liveness Detection for Face Recognition" in: Recent Advances in Face Recognition, 2008, pp. 109-124, Vienna : I-Tech, 2008, Ch. 9, ISBN: 978-953-7619-34-3.

Pan G., et al., "Monocular Camera-based Face Liveness Detection by Combining Eyeblink and Scene Context," pp. 215-225, s.l. : Springer Science+Business Media, LLC, Aug. 4, 2010. Retrieved from the Internet: URL: http://www.cs.zju.edu.cn/-gpan/publication/2011-TeleSysliveness.pdf.

Peng Y., et al., "RASL: Robust Alignment by Sparse and Low-Rank Decomposition for Linearly Correlated Images", IEEE Conference on Computer Vision and Pattern Recognition, 2010, pp. 763-770. Retrieved from the Internet: URL: http://yima.csl.illinois.edu/psfile/RASL CVPR10.pdf.

Phillips P. J., et al., "Biometric Image Processing and Recognition," Chellappa, 1998, Eusipco, 8 pages.

Phillips P.J., et al., "Face Recognition Vendor Test 2002: Evaluation Report," s.l. : N ISTIR 6965, 2002, 56 pages. Retrieved from the Internet: URL: http://www.facerec.org/vendors/FRVT2002 Evaluation Report.pdf.

Phillips P.J., et al., "FRVT 2006 and ICE 2006 Large-Scale Results", NIST IR 7408, Gaithersburg, NIST, 2006, Mar. 29, 2007, pp. 1-55.

Pinto A., et al., "Video-Based Face Spoofing Detection through Visual Rhythm Analysis," Los Alamitos : IEEE computer Society Conference Publishing Services, 2012, Conference on Graphics, Patterns and Images, 8 pages (SIBGRAPI). Retrieved from the Internet: URL: http://sibgrapi.sid.inpe.br/rep/sid.inpe.br/sibgrapi/2012/07.13.21.16?mirror=sid.inpe.br/ banon/2001/03.30.15.38.24&metadatarepository=sid.inpe.br/sibgrapi/2012/07.13.21.1 6.53.

Quinn G.W., et al., "Performance of Face Recognition Algorithms on Compressed Images", NIST Inter Agency Report 7830, NIST, Dec. 4, 2011.

Ratha N.K., et al., "An Analysis of Minutiae Matching Strength," Audio- and Video-Based Biometric Person Authentication, Springer Berlin Heidelberg, 2001, 7 pages.

Ratha N.K., et al., "An Analysis of Minutiae Matching StrengthP," Hawthorne, NY 10532, 7 pages, Retrieved from the Internet: URL: http:/lpdf.aminer.org/000/060/741/an analysis of minutiae matching_strength.pdf.

Ratha N.K., et al., "Enhancing Security and Privacy in Biometrics-Based Authentication Systems," IBM Systems Journal, 2001, vol. 40 (3), pp. 614-634.

Requirement for Restriction/Election from U.S. Appl. No. 14/218,504 mailed Aug. 16, 2016, 11 pages.

Roberts C., "Biometric Attack Vectors and Defences," Sep. 2006, 25 pages. Retrieved from the Internet: URL: http://otago.ourarchive.ac.nz/bitstream/handle/10523/1243/BiometricAttackVectors.pdf.

Rocha A., et al., "Vision of the Unseen: Current Trends and Challenges in Digital Image and Video Forensics," ACM Computing Surveys, 2010. Retrieved from the Internet: URL: http://www.wjscheirer.com/papers/wjs csur2011forensics.pdf.

Rodrigues R. N., et al., "Robustness of Multimodal Biometric Fusion Methods Against Spoof Attacks," Journal of Visual Language and Computing. 2009. 11 pages, doi:10.1016/j.jvlc.2009.01.010; Retrieved from the Internet: URL: http://cubs.buffalo.edutgovind/papers/visual09.pdf.

Ross A., et al., "Multimodal Biometrics: An Overview," Proceedings of 12th European Signal Processing Conference (EUSIPC0), Sep. 2004, pp. 1221-1224. Retrieved from the Internet: URL: http://www.csee.wvu.edu/-ross/pubs/RossMultimodaiOverview EUSIPC004.pdf.

Schneier B., Biometrics: Uses and Abuses. Aug. 1999. Inside Risks 110 (CACM 42, 8, Aug. 1999), Retrieved from the Internet: Url: http://www.schneiercom/essay-019.pdf.

Schuckers, "Spoofing and Anti-Spoofing Measures," Information Security Technical Report, 2002, vol. 2002, pp. 56-62.

Schwartz., et al., "Face Spoofing Detection Through Partial Least Squares and Low-Level Descriptors," International Conference on Biometrics, 2011, vol. 2011, pp. 1-8.

Smiatacz M., et al., Gdansk University of Technology. Liveness Measurements Using Optical Flow for Biometric Person Authentication. Metrology and Measurement Systems. 2012, vol. XIX, 2. pp. 257-268.

Supplementary Partial European Search Report for Application No. 13867269, mailed Aug. 3, 2016, 7 pages.

T. Weigold et al., "The Zurich Trusted Information Channel-An Efficient Defence against Man-in-the-Middle and Malicious Software Attacks," P. Lipp, A.R. Sadeghi, and K.M. Koch, eds., Proc. Trust Conf. (Trust 2008), LNCS 4968, Springer-Verlag, 2008, pp. 75-91.

Tan., et al., "Face Liveness Detection from a Single Image with Sparse Low Rank Bilinear Discriminative Model," European Conference on Computer Vision, 2010, vol. 2010, pp. 1-14.

The Extended M2VTS Database, [retrieved on Sep. 29, 2012], Retrieved from the Internet: URL: http://www.ee.surrey.ac.uk/CVSSP/xm2vtsdb/.

The Online Certificate Status Protocol, OCSP, RFC2560, 22 pages.

The source for Linux information, Linux.com, [online], [retrieved on Jan. 28, 2015], 2012, 3 pages.

Transmittal of International Preliminary Report on Patentability for Patent Application No. PCT/US2013/077888, mailed on Jul. 9, 2015, 7 pages.

Transmittal of International Preliminary Report on Patentability from foreign counterpart PCT Patent Application No. PCT/US2014/031344, mailed Oct. 1, 2015, 9 pages.

Abate A., et al.,"2D and 3D face recognition: A survey", 2007, pp. 1885-1906.

Advisory Action from U.S. Appl. No. 13/730,791, mailed Jan. 23, 2015, 4 pages.

Akhtar Z., et al.,"Spoof Attacks on Multimodal Biometric Systems", International Conference on Information and Network Technology, 2011, vol. 4, pp. 46-51.

Bao W. et al.' "A liveness detection method for face recognition based on optical flow field", 2009, pp. 233-236, http://eeexplore.ieee.org/stamp/stamp.jsp?tp=&amumber=5054589 &isnurnber=5054562.

Barker E., et al.,"Recommendation for key management Part 3: Application-Specific Key Management Guidance", NIST Special Publication 800-57, 2009, pp. 1-103.

BehavioSec, "Measuring FAR/FRR/EER in Continuous Authentication," Stockholm, Sweden (2009).

Brickell, E., et al., "Direct anonymous attestation." Proceedings of the 11th ACM conference on Computer and communications security. ACM, 2004, 6 pages.

Brickell, E., et al., Intel Corporation; Jan Camenish, IBM Research; Liqun Chen, HP Laboratories. "Direct Anonymous Attestation". Feb. 11, 2004, pp. 1-28 [online]. Retrieved from the Internet: URL:https:/eprint.iacr.org/2004/205.pdf.

Chakka M., et al., "Competition on Counter Measures to 2-D Facial Spoofing Attacks". 6 pages .2011. http://www.csis.pace.edu/-ctappert/dps/IJCB2011/papers/130.pdf. 978-1-4577-1359-0/11.

Chen L., et al., "Flexible and scalable digital signatures in TPM 2.0." Proceedings of the 2013 ACM SIGSAC conference on Computer & communications security. ACM, 2013.

Chetty G. School of ISE University of Canberra Australia. "Multilevel liveness verification for face-voice biometric authentication". BYSM-2006 Symposium. Baltimore: BYSM-Symposium 9 pages. Sep. 19, 2006. http://www.biometrics.org/bc2006/presentations/Tues_Sep_19/BSYM/19_Chetty_research.pdf.

Continuous User Authentication Using Temporal Information, http://www.cse.msu.edu/biometrics/Publications/Face/NiinumaJain_ContinuousAuth_SPIE10.pdf, 11 pages.

crazy Egg Heatmap Shows Where People Click on Your Website, 2012, 3 pages, www.michaelhartzell.com/Blog/bid/92970/Crazy-Egg-Heatmap-shows-where-people-click-on-your-website).

Dawei Zhang; Peng Hu, "Trusted e-commerce user agent based on USB Key", Proceedings of the International MultiConference of Engineers and Computer Scientists 2008 vol. I, IMECS 2008, Mar. 19-28, 2008, Hong Kong.

Delac K. et al., Eds., InTech, Jun. 1, 2008, Retrieved from the Internet:, ISBN 978-953-7619-34-3, Uploaded as individual Chapters 1-15.

(56) References Cited

OTHER PUBLICATIONS

Doherty, et al., Internet Engineering Task Force (IETF), "Dynamic Symmetric Key Provisioning Protocol (DSKPP)", Dec. 2010, 105 pages.
Edited by Kresimir Delac, Mislay Grgic and Marian Stewart Bartlett. s.l. : InTech Jun. 1, 2008. http://cdn.intechopen.com/finals/81/InTech-Recent_advances_in_face_recognition.zip. ISBN 978-953-7619-34-3. Uploaded as Chapters 1-15.
Final Office Action from U.S. Appl. No. 13/730,761, mailed Jan. 15, 2015, 31 pages.
Final Office Action from U.S. Appl. No. 13/730,761, mailed Jul. 8, 2014, 36 pages.
Final Office Action from U.S. Appl. No. 13/730,776, mailed Nov. 3, 2014, 20 pages.
Final Office Action from U.S. Appl. No. 13/730,780, mailed Jan. 27, 2015, 30 pages.
Final Office Action from U.S. Appl. No. 13/730,780, mailed May 12, 2014, 34 pages.
Final Office Action from U.S. Appl. No. 13/730,791, mailed Nov. 13, 2014, 22 pages.
Final Office Action from U.S. Appl. No. 13/730,795, mailed Aug. 14, 2014, 20 pages.
Final Office Action from U.S. Appl. No. 13/730,795, mailed Jan. 5, 2015, 19 pages.
Final Office Action from U.S. Appl. No. 14/066,273, mailed Feb. 11, 2016, 29 pages.
Final Office Action from U.S. Appl. No. 14/066,384, mailed Aug. 20, 2015, 23 pages.
Final Office Action from U.S. Appl. No. 14/218,551, mailed Sep. 9, 2015, 15 pages.
Final Office Action from U.S. Appl. No. 14/218,57, mailed Aug. 7, 2015, 19 pages.
Final Office Action from U.S. Appl. No. 14/218,575, mailed Jul. 7, 2016, 29 pages.
Final Office Action from U.S. Appl. No. 14/218,646, mailed Aug. 11, 2016, 25 pages.
Final Office Action from U.S. Appl. No. 14/218,692, mailed Mar. 2, 2016, 24 pages.
Final Office Action from U.S. Appl. No. 14/268,733, mailed Jan. 15, 2016, 14 pages.
Final Office Action from U.S. Appl. No. 14/448,814, mailed Feb. 16, 2016, 14 pages.
Final Office Action from U.S. Appl. No. 14/448,814, mailed Jun. 14, 2016, 17 pages.
Final Office Action from U.S. Appl. No. 14/448,868, mailed Aug. 19, 2016, 11 pages.
Grother, P. J., et al., NIST. Report on the Evaluation of 2D Still-Image Face Recognition Algorithms, NIST IR 7709. s.l, NIST, 2011, Jun. 22, 2010, pp. 1-58.
GSM Arena. [Online] Nov. 13, 2011, [Cited: Sep. 29, 2012], [retrieved on Aug. 18, 2015]. Retrieved from the internet: URL: http://www.gsmarena.com/ice cream sandwichs face unlock duped using a photo graph-news-3377.php.
Heikkila, M., et al., "A Texture-Based Method for Modeling the Background and Detecting Moving Objects". Oulu : IEEE [online]. Jun. 22 2005. Draft. 16 pages Retrieved from the Internet: URL:http://www.ee.oulu.fi/mvg/files/pdf/pdf_662.pdf.
Hernandez, T., "But What Does It All Mean? Understanding Eye-Tracking Results (Part 3)", Sep. 4, 2007, 2 pages. EyeTools. Part III: What is a heatmap . . . really? [Online] [Cited: Nov. 1, 2012.] Retrieved from the Internet: URL:http://eyetools.com/articles/p3-understanding-eye-tracking-what-is-a-heatmap-really.
Himanshu, et al., "A Review of Face Recognition". International Journal of Research in Engineering & Applied Sciences. Feb. 2012, vol. 2, pp. 835-846. Retrieved from the Internet: URL:http://euroasiapub.org/IJREAS/Feb2012/81.pdf.
Huang L, et al., "Clickjacking: Attacks and Defenses". S.I. : Usenix Security 2012, pp. 1-16, 2012 [online]. Retrieved from the Internet: URL:https://www.usenix.org/system/files/conference/usenixsecurity12/sec12-final39.pdf.

Jafri R., et al. "A Survey of Face Recognition Techniques," Journal of Information Processing Systems, 2009, vol. 5 (2), pp. 41-68.
Kollreider K, et al., "Evaluating Liveness by Face Images and the Structure Tensor," Halmstad, Sweden: s.n., Halmstad University, SE-30118, Sweden, [online], 2005, Retrieved from the Internet: URL:http://citeseerx.ist.psu.edu/viewdoc/download?doi=1 0.1.1.62.6534&rep=rep1 &type=pdf, pp. 75-80.
Kollreider K., et al., "Non-Intrusive Liveness Detection by Face Images," Image and Vision Computing, 2007, vol. 27 (3), pp. 233-244.
Kong S., et al. "Recent Advances in Visual and Infrared Face Recognition: A Review," Journal of Computer Vision and Image Understanding, 2005, vol. 97 (1), pp. 103-135.
Li J., et al., "Live Face Detection Based on the Analysis of Fourier Spectra," Biometric Technology for Human Identification, 2004, pp. 296-303.
Lubin, G., et al., "16 Heatmaps That Reveal Exactly Where People Look," Business Insider, [online], May 21, 2012, [Cited: Nov. 1, 2012], Retrieved from the Internet: URL: http://www.businessinsider.com/eye-tracking-heatmaps-2012-5?pp=1, pp. 1-21.
Maatta J., et al., "Face Spoofing Detection From Single Images Using Micro-Texture Analysis," Machine Vision Group, University of Oulu, Finland, Oulu, IEEE, [online], 2011, Retrieved from the Internet: URL:http://www.ee.oulu.fi/research/mvmp/mvg/files/pdf/131.pdf., pp. 1-7.
Marcialis G. L., et al. "First International Fingerprint Liveness Detection Competition-Livdet 2009," Image Analysis and Processing-ICIAP, Springer Berlin Heidelberg, 2009. pp. 12-23.
Mobile Device Security Using Transient Authentication, IEEE Transactions on Mobile Computing, 2006, vol. 5 (11), pp. 1489-1502.
National Science & Technology Council's Subcommittee on Biometrics. Biometrics Glossary. 33 pages, Last updated Sep. 14, 2006. NSTC. http://www.biometrics.gov/documents/glossary.pdf.
Nielsen, Jakib. useit.com. Jakob Nielsen's Alertbox—Horizontal Attention Leans Left. [Online] Apr. 6, 2010. [Cited: Nov. 1, 2012.] 4 pages. http://www.useit.com/alertbox/horizontal-attention.html.
Nielsen, Jakob. useit.com. Jakob Nielsen's Alertbox—Scrolling and Attention. [Online] Mar. 22, 2010. [Cited: Nov. 1, 2012.] 6 pages. http://www.useit.com/alertbox/scrolling-attention.html.
Non-Final Office Action from U.S. Appl. No. 14/448868, mailed Dec. 31, 2015, 12 pages.
Non-Final Office Action from U.S. Appl. No. 14/487992, mailed Dec. 3, 2015, 15 pages.
Non-Final Office Action from U.S. Appl. No. 13/730,761, mailed Feb. 27, 2014, 24 pages.
Non-Final Office Action from U.S. Appl. No. 13/730,76, mailed Sep. 39, 2014, 36 pages.
Non-Final Office Action from U.S. Appl. No. 13/730,776, mailed Jul. 15, 2014, 16 pages.
Non-Final Office Action from U.S. Appl. No. 13/730,780, mailed Aug. 4, 2014, 30 pages.
Non-Final Office Action from U.S. Appl. No. 13/730,780, mailed Mar. 12, 2014, 22 pages.
Non-Final Office Action from U.S. Appl. No. 13/730,791, mailed Jun. 27, 2014, 17 pages.
Non-Final Office Action from U.S. Appl. No. 13/730,795, mailed Jun. 11, 2014, 14 pages.
Non-Final Office Action from U.S. Appl. No. 14/066,273, mailed Jun. 16, 2016, 43 pages.
Non-Final Office Action from U.S. Appl. No. 14/066,273, mailed May 8, 2015, 31 pages.
Non-Final Office Action from U.S. Appl. No. 14/066,384, mailed Jan. 7, 2015, 24 pages.
Non-Final Office Action from U.S. Appl. No. 14/066,384, mailed Mar. 17, 2016, 40 pages.
Non-Final Office Action from U.S. Appl. No. 14/145,439, mailed Feb. 12, 2015, 18 pages.
Non-Final Office Action from U.S. Appl. No. 14/145,533, mailed Jan. 26, 2015, 13 pages.
Non-Final Office Action from U.S. Appl. No. 14/145,607, mailed Mar. 20, 2015, 22 pages.

(56) References Cited

OTHER PUBLICATIONS

Non-Final Office Action from U.S. Appl. No. 14/218,551, mailed Apr. 23, 2015, 9 pages.
Non-Final Office Action from U.S. Appl. No. 14/218,551, mailed Jan. 21, 2016, 11 pages.
Non-Final Office Action from U.S. Appl. No. 14/218,551, mailed May 12, 2016, 11 pages.
Non-Final Office Action from U.S. Appl. No. 14/218,575, mailed Feb. 10, 2015, 17 pages.
Non-Final Office Action from U.S. Appl. No. 14/218,575, mailed Jan. 29, 2016, 25 pages.
Non-Final Office Action from U.S. Appl. No. 14/218,611, mailed Jun. 16, 2016, 13 pages.
Non-Final Office Action from U.S. Appl. No. 14/218,646, mailed Mar. 10, 2016, 23 pages.
Non-Final Office Action from U.S. Appl. No. 14/218,677, mailed Aug. 2, 2016, 15 pages.
Non-Final Office Action from U.S. Appl. No. 14/218,692, mailed Nov. 34, 2015, 16 pages.
Non-Final Office Action from U.S. Appl. No. 14/218,743, mailed Aug. 19, 2016, 11 pages.
Non-Final Office Action from U.S. Appl. No. 14/218,743, mailed Jan. 21, 2016, 12 pages.
Non-Final Office Action from U.S. Appl. No. 14/268,733, mailed Jul. 16, 2015, 13 pages.
Non-Final Office Action from U.S. Appl. No. 14/448,641, mailed Nov. 39, 2015, 21 pages.
Non-Final Office Action from U.S. Appl. No. 14/448,747, mailed Aug. 19, 2016, 21 pages.
Non-Final Office Action from U.S. Appl. No. 14/448,814, mailed Aug. 4, 2015, 13 pages.
Notice of Allowance from U.S. Appl. No. 14/487992, mailed May 12, 2016, 11 pages.
Notice of Allowance from U.S. Appl. No. 13/730,761, mailed Jun. 10, 2015, 15 pages.
Notice of Allowance from U.S. Appl. No. 13/730,761, mailed Sep. 28, 2015, 5 pages.
Notice of Allowance from U.S. Appl. No. 13/730,776, mailed Feb. 13, 2015, 16 pages.
Notice of Allowance from U.S. Appl. No. 13/730,776, mailed Mar. 24, 2015, 3 pages.
Notice of Allowance from U.S. Appl. No. 13/730,780, mailed Aug. 13, 2015, 13 pages.
Notice of Allowance from U.S. Appl. No. 13/730,791, mailed Mar. 10, 2015, 17 pages.
Notice of Allowance from U.S. Appl. No. 13/730,795, mailed Jan. 14, 2016, 11 pages.
Notice of Allowance from U.S. Appl. No. 13/730,795, mailed May 15, 2015, 8 pages.
Notice of Allowance from U.S. Appl. No. 13/730,795, mailed Sep. 17, 2015, 11 pages.
Notice of Allowance from U.S. Appl. No. 14/145,439, mailed Jul. 6, 2015, 6 pages.
Notice of Allowance from U.S. Appl. No. 14/145,439, mailed Mar. 14, 2016, 17 pages.
Notice of Allowance from U.S. Appl. No. 14/145,439, mailed Oct. 28, 2015, 12 pages.
Notice of Allowance from U.S. Appl. No. 14/145,533, mailed Jan. 20, 2016, 12 pages.
Notice of Allowance from U.S. Appl. No. 14/145,533, mailed May 11, 2015, 5 pages.
Tresadern P., et al., "Mobile Biometrics (MoBio): Joint Face and Voice Verification for a Mobile Platform", 2012, Retrieved from the Internet: URL: http://personal.ee.surrey.ac.uk/Personai/Norman.Poh/data/tresadern_PervComp2012draft.pdf.
Tronci R., et al., "Fusion of Multiple Clues for Photo-Attack Detection in Face Recognition Systems," Inti. Joint conference on Biometrics, 2011. pp. 1-6.
Uludag, Umut, and Anil K. Jain. "Attacks on biometric systems: a case study in fingerprints." Electronic Imaging 2004. International Society for Optics and Photonics, 2004, 12 pages.
Unobtrusive User-Authentication on Mobile Phones using Biometric Gait Recognition, 2010, 6 pages.
Validity, OSTP Framework, 24 pages, 2010.
Vassilev, A. T.; du Castel, B.; Ali, A. M., "Personal Brokerage of Web Service Access," Security & Privacy, IEEE , vol. 5, No. 5, pp. 24-31, Sep.-Oct. 2007.
WikiPedia article for Eye Tracking, 15 pages, Last Modified Jun. 21, 2014, en.wikipedia.org/wiki/Eye_tracking.
Willis N., Linux.com. Weekend Project: Take a Tour of Open Source Eye-Tracking Software. [Online] Mar. 2, 2012. [Cited: Nov. 1, 2012.] Retrieved from the Internet: URL: https://www.linux.com/learn/tutorials/550880-weekend-project-take-a-tour-of-opensource-eye-tracking-software.
Wilson, R., James. Unbuntu Life, "How to Trick Google's New Face Unlock on Android 4.1 Jelly Bean". Print Screen Mac. [Online] Aug. 6, 2012. [Cited: Sep. 28, 2012 .] http://printscreenmac.info/how-to-trick-android-jelly-bean-faceunlock/. downloaded Aug. 13, 2015.
World Wide Web Consortium, W3C Working Draft: Media Capture and Streams, 2013.
Zhao W., et al., "Face Recognition: A Literature Survey," ACM Computing Surveys, 2003, vol. 35 (4), pp. 399-458.
Zhou, et al., "Face Recognition from Still Images and Videos". University of Maryland, College Park, MD 20742. Maryland : s.n., Nov. 5, 2004. pp. 1-23, Retrieved from the Internet: http://citeseerx.ist.psu.edu/viewdoc/download?doi=1 0.1.1.77.1312&rep=rep1&type=pdf.
Extended European Search Report for Application No. 13867269, mailed Nov. 4, 2016, 10 pages.
International Preliminary Report on Patentability for Application No. PCT/US2015/028924, mailed 17 Nov. 2016, 9 pages.
International Preliminary Report on Patentability for Application No. PCT/US2015/028927, mailed Nov. 17, 2016, 10 pages.
Final Office Action from U.S. Appl. No. 14/218,551, mailed Sep. 16, 2016, 11 pages.
Non-Final Office Action from U.S. Appl. No. 14/145,466, mailed Sep. 9, 2016, 13 pages.
Non-Final Office Action from U.S. Appl. No. 14/218,692, mailed Oct. 25, 2016, 33 pages.
Non-Final Office Action from U.S. Appl. No. 14/859,328, mailed Sep. 15, 2016, 39 pages.
Notice of Allowance from U.S. Appl. No. 14/066,384, mailed Sep. 27, 2016, 19 pages.
Notice of Allowance from U.S. Appl. No. 14/268,733, mailed Sep. 23, 2016, 8 pages.
Notice of Allowance from U.S. Appl. No. 14/448,697, mailed Sep. 1, 2016, 3 pages.
Notice of Allowance from U.S. Appl. No. 14/487,992, mailed Sep. 6, 2016, 26 pages.
Zhang, "Security Verification of Hardware-enabled Attestation Protocols," IEEE, 2012, pp. 47-54.

\* cited by examiner

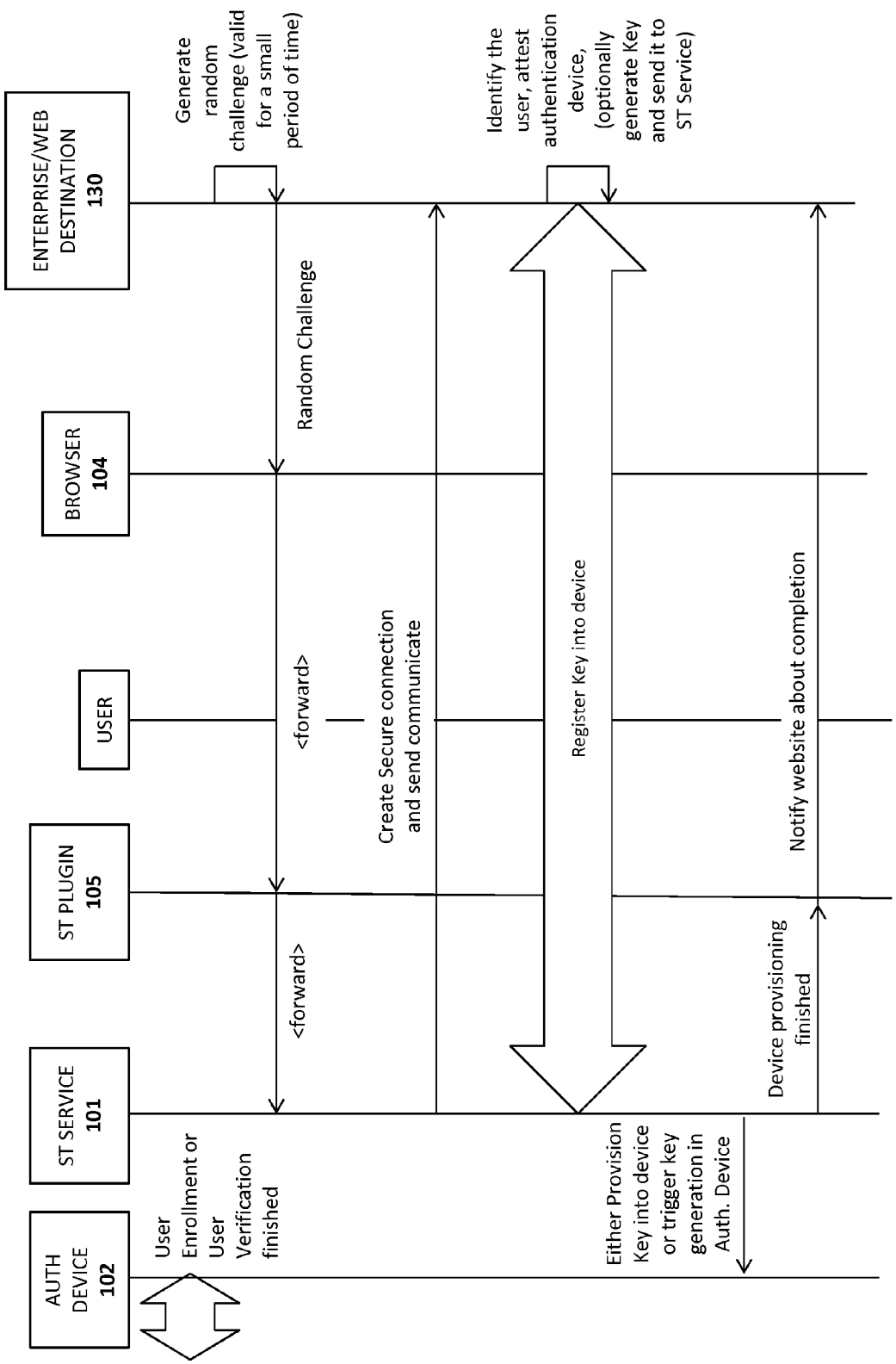

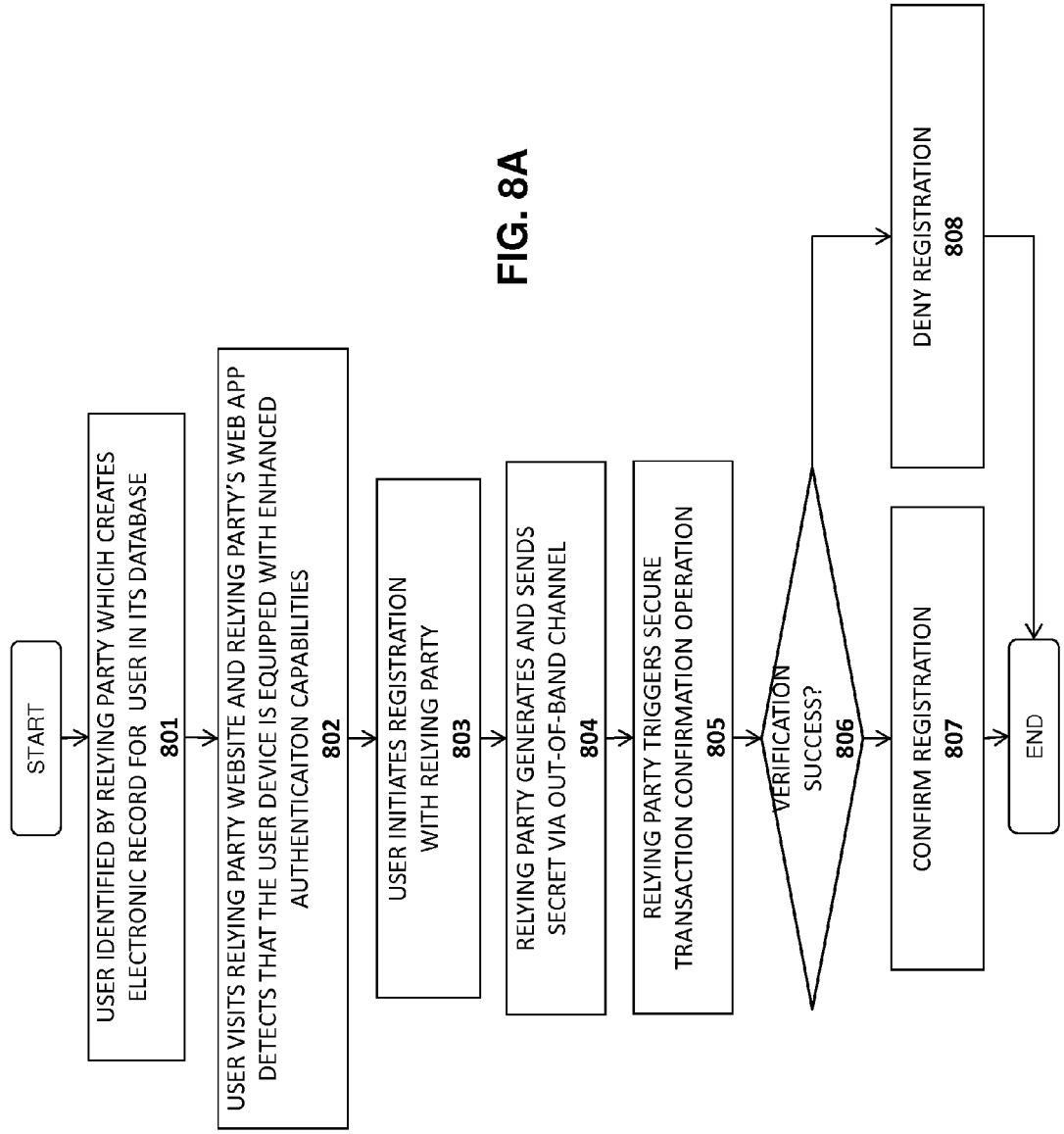

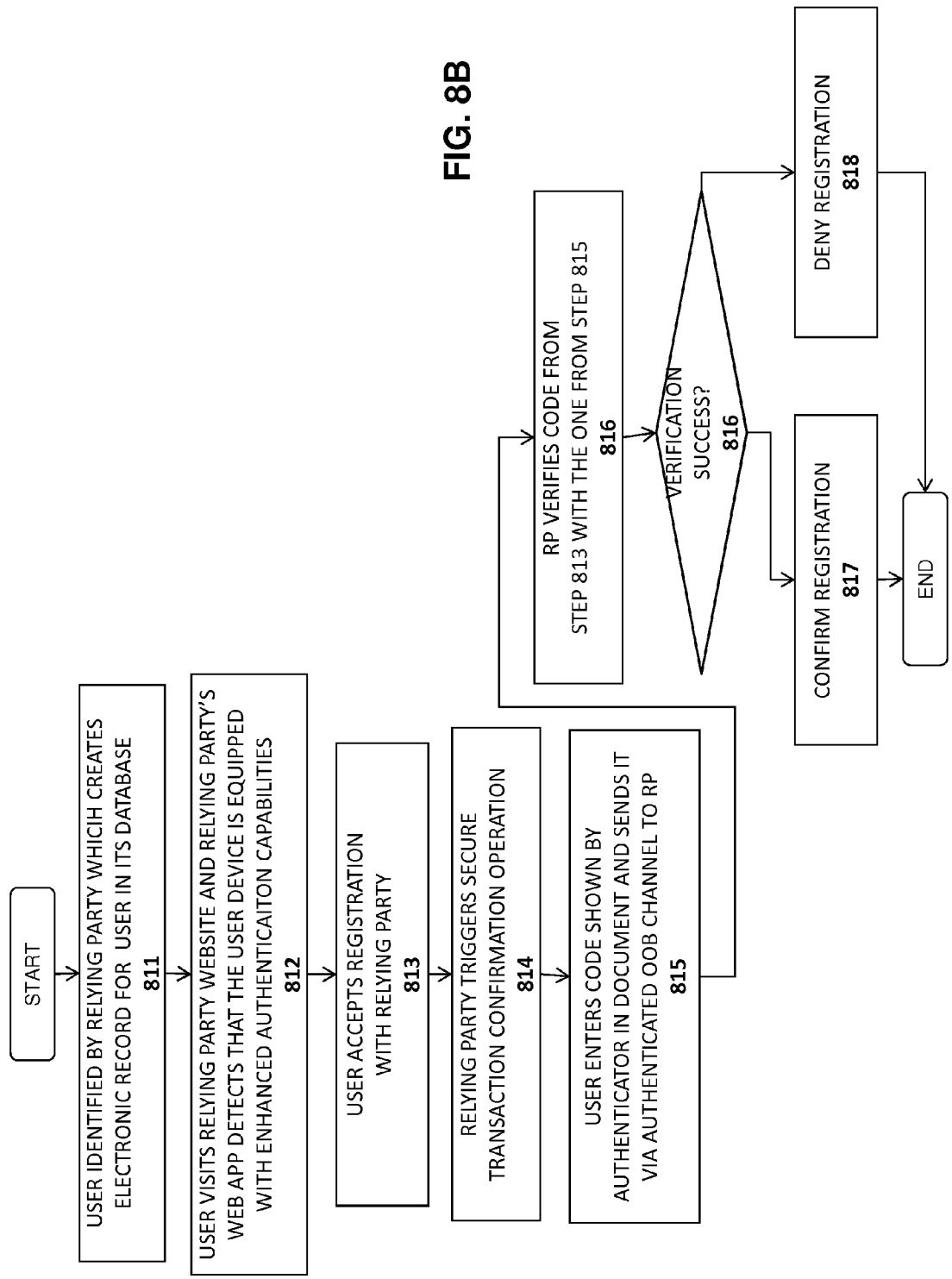

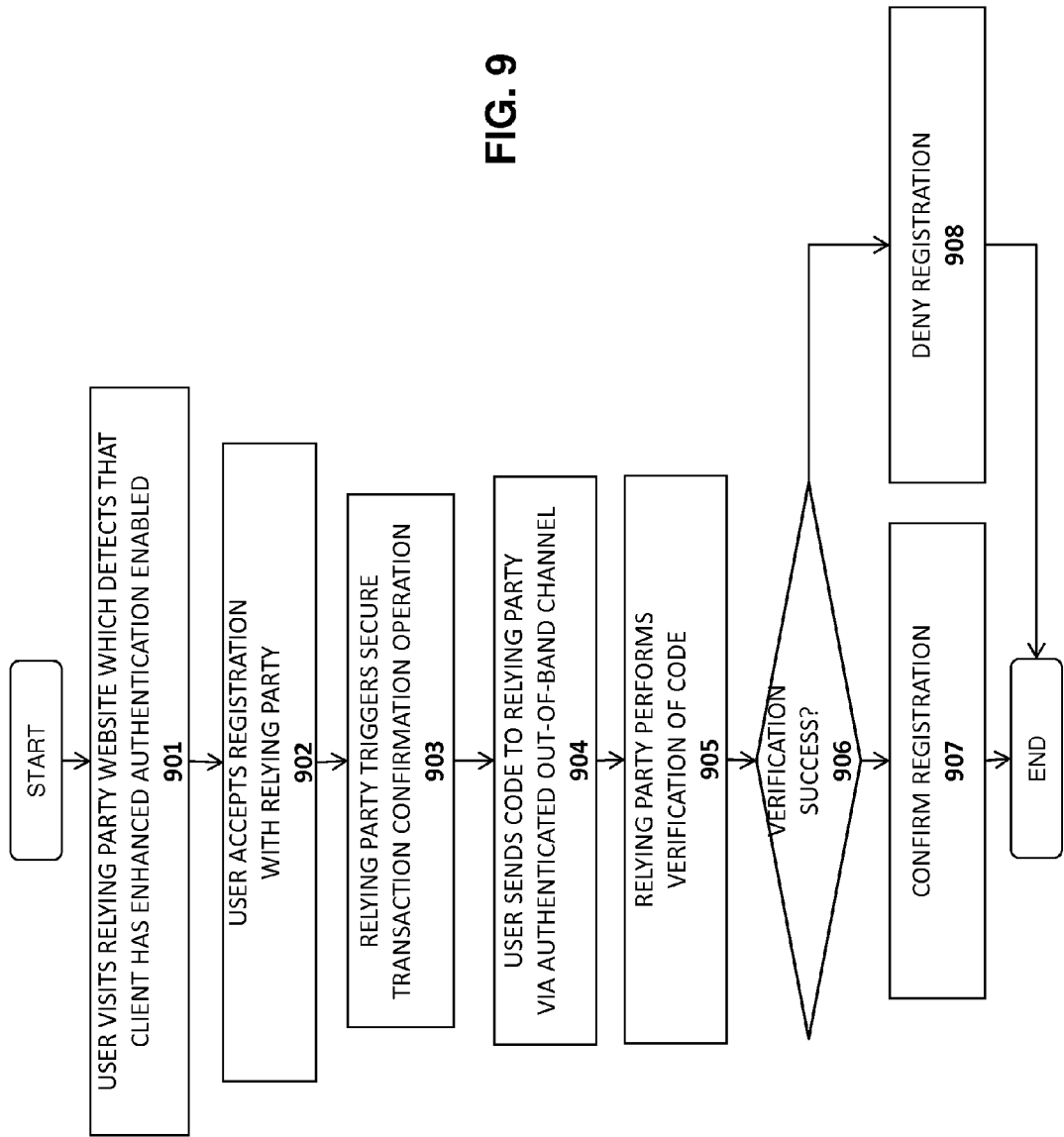

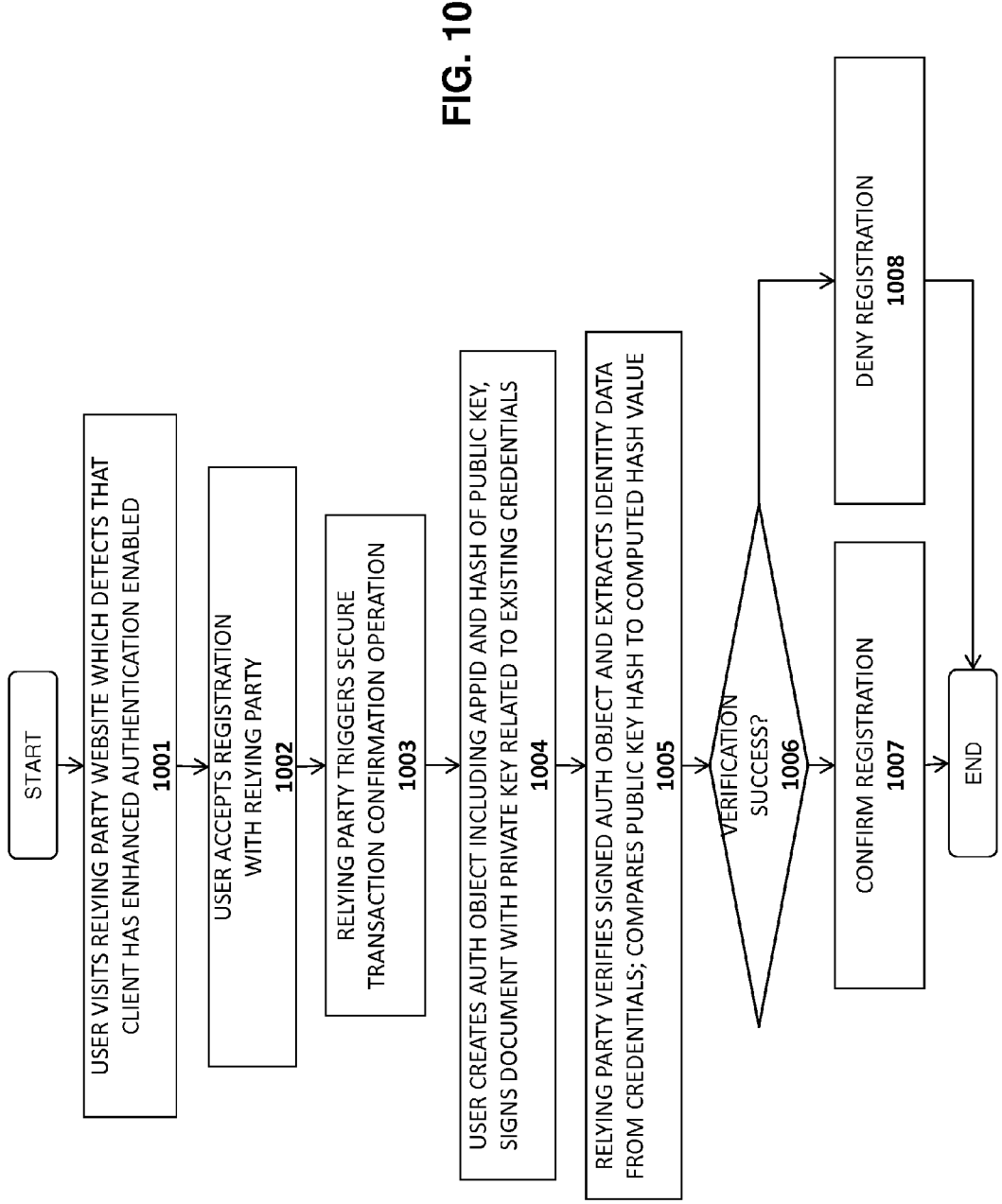

ENHANCED SECURITY FOR REGISTRATION OF AUTHENTICATION DEVICES

BACKGROUND

Field of the Invention

This invention relates generally to the field of data processing systems. More particularly, the invention relates to an apparatus and method for secure registration of authentication devices.

Description of Related Art

Systems have also been designed for providing secure user authentication over a network using biometric sensors. In such systems, the score generated by an authenticator, and/or other authentication data, may be sent over a network to authenticate the user with a remote server. For example, Patent Application No. 2011/0082801 ("'801 application") Describes a Framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc).

The assignee of the present application has developed a variety of improvements to the authentication framework described in the '801 application. Some of these improvements are described in the following set of US Patent Applications ("Co-pending Applications"), which are assigned to the present assignee: Ser. No. 13/730,761, Query System and Method to Determine Authentication Capabilities; Ser. No. 13/730,776, System and Method for Efficiently Enrolling, Registering, and Authenticating With Multiple Authentication Devices; Ser. No. 13/730,780, System and Method for Processing Random Challenges Within an Authentication Framework; Ser. No. 13/730,791, System and Method for Implementing Privacy Classes Within an Authentication Framework; Ser. No. 13/730,795, System and Method for Implementing Transaction Signaling Within an Authentication Framework; and Ser. No. 14/218,504, Advanced Authentication Techniques and Applications (hereinafter "'504 application").

Briefly, the Co-Pending Applications describe authentication techniques in which a user enrolls with authentication devices (or Authenticators) such as biometric devices (e.g., fingerprint sensors) on a client device. When a user enrolls with a biometric device, biometric reference data is captured by the biometric sensor of the authentication device (e.g., by swiping a finger, snapping a picture, recording a voice, etc). The user may subsequently register the authentication devices with one or more servers over a network (e.g., Websites or other relying parties equipped with secure transaction services as described in the Co-Pending Applications), and subsequently authenticate with those servers using data exchanged during the registration process (e.g., cryptogtaphic keys provisioned into the authentication devices). Once authenticated, the user is permitted to perform one or more online transactions with a Website or other relying party. In the framework described in the Co-Pending Applications, sensitive information such as fingerprint data and other data which can be used to uniquely identify the user, may be retained locally on the user's authentication device to protect a user's privacy. The '504 application describes a variety of additional techniques including techniques for designing composite authenticators, intelligently generating authentication assurance levels, using non-intrusive user verification, transferring authentication data to new authentication devices, augmenting authentication data with client risk data, and adaptively applying authentication policies, and creating trust circles, to name just a few.

BRIEF DESCRIPTION OF THE DRAWINGS

A better understanding of the present invention can be obtained from the following detailed description in conjunction with the following drawings, in which:

FIG. 2 is a transaction diagram showing how keys may be registered into authentication devices.

FIGS. 8A-B illustrate different embodiments of a method for secure registration;

FIG. 9 illustrates another embodiment of a method in which a secret is sent from a user to the relying party;

FIG. 10 illustrates another embodiment of a method in which a user's existing credentials are used for registration.

DETAILED DESCRIPTION OF PREFERRED EMBODIMENTS

Figure 1A:
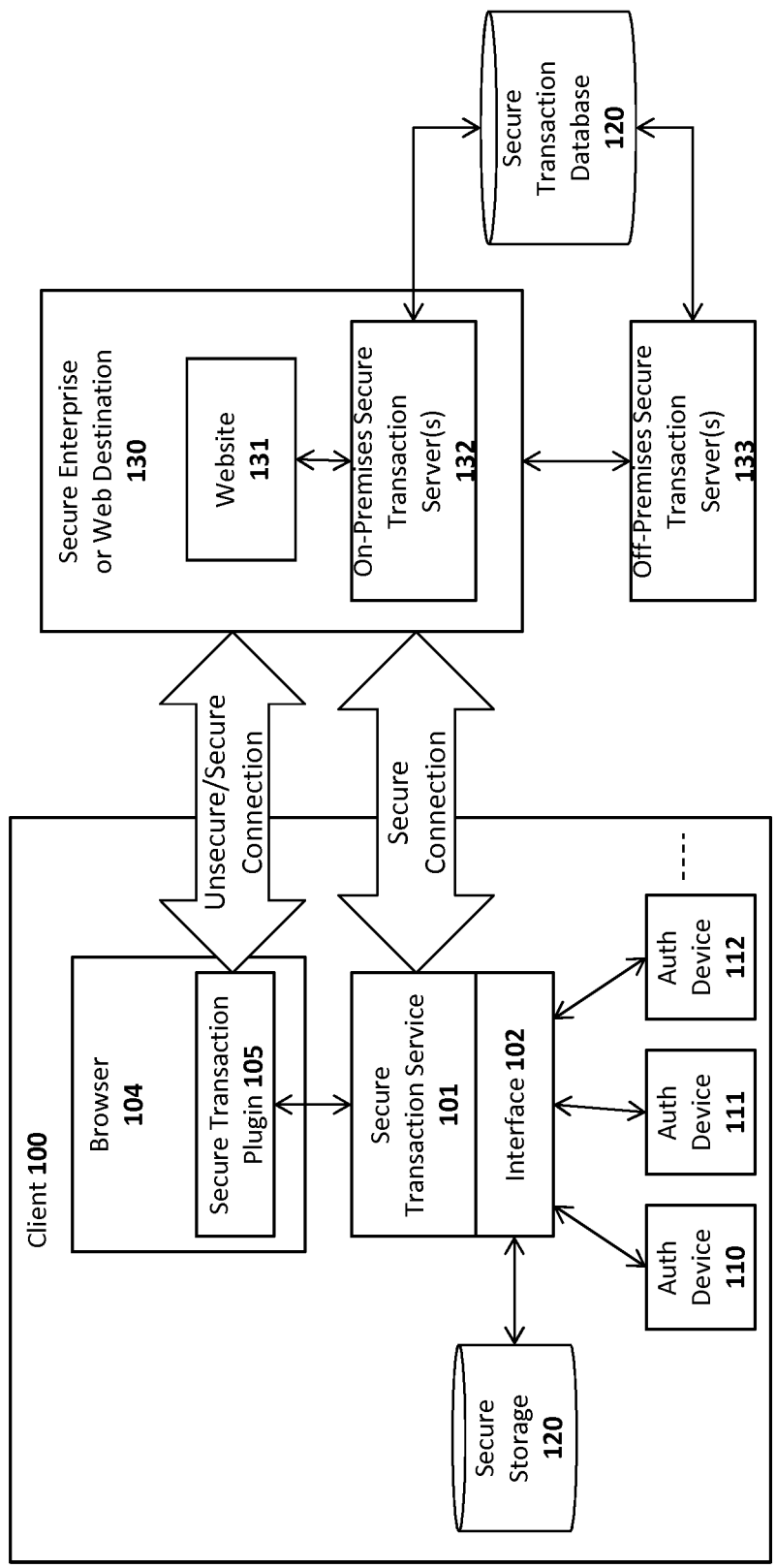
FIGS. 1A-B illustrate two different embodiments of a secure authentication system architecture.

Described below are embodiments of an apparatus, method, and machine-readable medium for implementing advanced authentication techniques and associated applications. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve authentication devices with user verification capabilities such as biometric devices or PIN entry. These devices are sometimes referred to herein as "tokens," "authentication devices," or "authenticators." While certain embodiments focus on facial recognition hardware/software (e.g., a camera and associated software for recognizing a user's face and tracking a user's eye movement), some embodiments may utilize additional biometric devices including, for example, fingerprint sensors, voice recognition hardware/software (e.g., a microphone and associated software for recognizing a user's voice), and optical recognition capabilities (e.g., an optical scanner and associated software for scanning the retina of a user). The user verification capabilities may also include non-biometric modalities, like PIN entry. The authenticators might use devices like trusted platform modules (TPMs), smartcards and secure elements for cryptographic operations.

In a mobile biometric implementation, the biometric device may be remote from the relying party. As used herein, the term "remote" means that the biometric sensor is not part of the security boundary of the computer it is communicatively coupled to (e.g., it is not embedded into the same physical enclosure as the relying party's computer). By way of example, the biometric device may be coupled to the relying party via a network (e.g., the Internet, a wireless network link, etc) or via a peripheral input such as a USB port. Under these conditions, there may be no way for the relying party to know if the device is one which is authorized by the relying party (e.g., one which provides an acceptable level of authentication strength and integrity protection) and/or whether a hacker has compromised or even replaced the biometric device. Confidence in the biometric device depends on the particular implementation of the device.

The term "local" is used herein to refer to the fact that the user is completing a transaction in person, at a particular location such as at an automatic teller machine (ATM) or a point of sale (POS) retail checkout location. However, as discussed below, the authentication techniques employed to authenticate the user may involve non-location components such as communication over a network with remote servers and/or other data processing devices. Moreover, while specific embodiments are described herein (such as an ATM and retail location) it should be noted that the underlying principles of the invention may be implemented within the context of any system in which a transaction is initiated locally by an end user.

The term "relying party" is sometimes used herein to refer, not merely to the entity with which a user transaction is attempted (e.g., a Website or online service performing user transactions), but also to the secure transaction servers implemented on behalf of that entity which may performed the underlying authentication techniques described herein. The secure transaction servers may be owned and/or under the control of the relying party or may be under the control of a third party offering secure transaction services to the relying party as part of a business arrangement.

The term "server" is used herein to refer to software executed on a hardware platform (or across multiple hardware platforms) that receives requests over a network from a client, responsively performs one or more operations, and transmits a response to the client, typically including the results of the operations. The server responds to client requests to provide, or help to provide, a network "service" to the clients. Significantly, a server is not limited to a single computer (e.g., a single hardware device for executing the server software) and may, in fact, be spread across multiple hardware platforms, potentially at multiple geographical locations.

Exemplary System Architectures

Figure 1B:
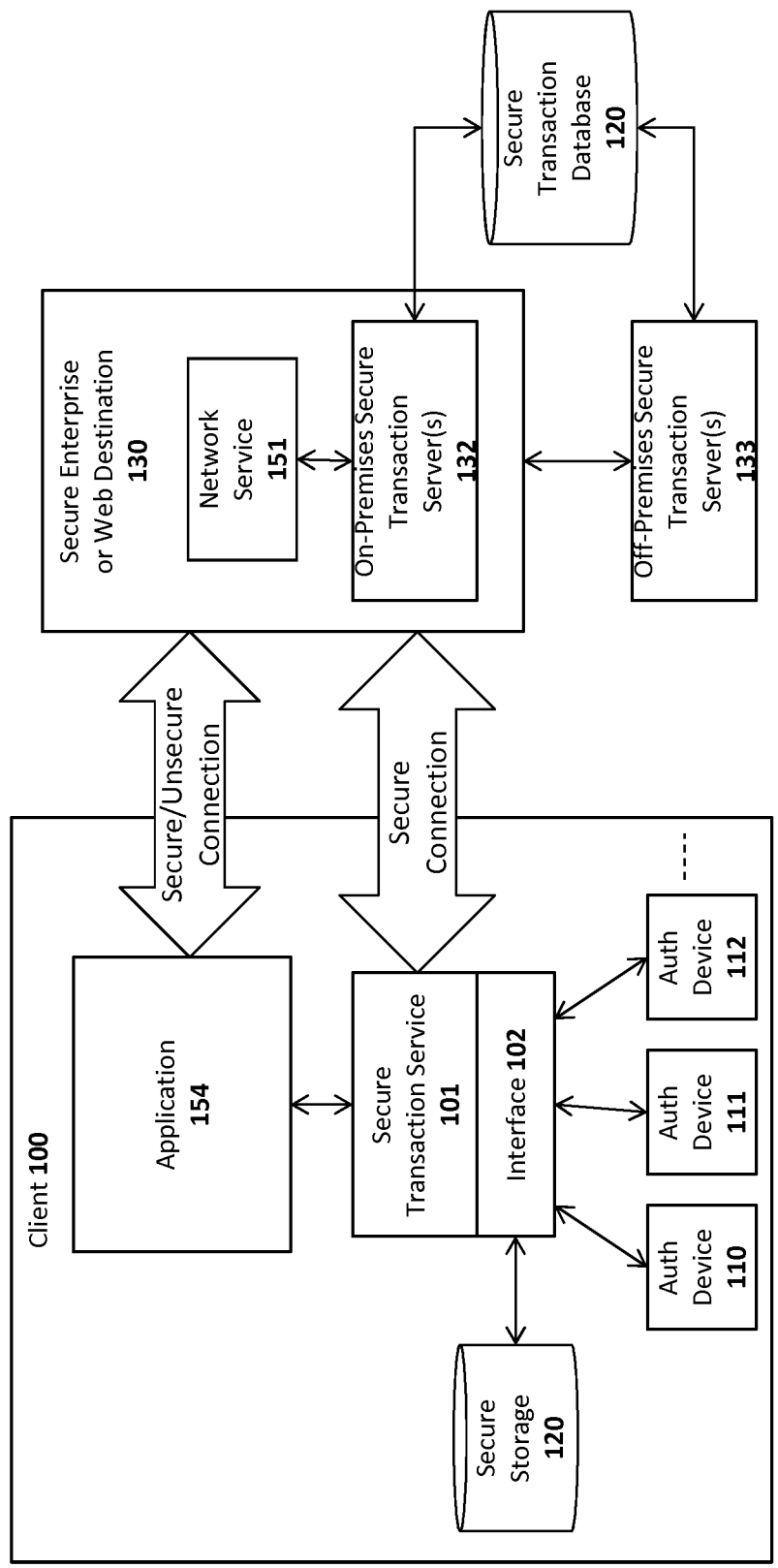

FIGS. 1A-B illustrate two embodiments of a system architecture comprising client-side and server-side components for authenticating a user. The embodiment shown in FIG. 1A uses a web browser plugin-based architecture for communicating with a website while the embodiment shown in FIG. 1B does not require a web browser. The various techniques described herein such as enrolling a user with authentication devices, registering the authentication devices with a secure server, and verifying a user may be implemented on either of these system architectures. Thus, while the architecture shown in FIG. 1A is used to demonstrate the operation of several of the embodiments described below, the same basic principles may be easily implemented on the system shown in FIG. 1B (e.g., by removing the browser plugin 105 as the intermediary for communication between the server 130 and the secure transaction service 101 on the client).

Turning first to FIG. 1A, the illustrated embodiment includes a client 100 equipped with one or more authentication devices 110-112 (sometimes referred to in the art as authentication "tokens" or "Authenticators") for enrolling and verifying an end user. As mentioned above, the authentication devices 110-112 may include biometric device such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and support for non-biometric modalities, such as PIN verification. The authentication devices might use trusted platform modules (TPMs), smartcards or secure elements for cryptographic operations and key storage.

The authentication devices 110-112 are communicatively coupled to the client through an interface 102 (e.g., an application programming interface or API) exposed by a secure transaction service 101. The secure transaction service 101 is a secure application for communicating with one or more secure transaction servers 132-133 over a network and for interfacing with a secure transaction plugin 105 executed within the context of a web browser 104. As illustrated, the Interface 102 may also provide secure access to a secure storage device 120 on the client 100 which stores information related to each of the authentication devices 110-112 such as a device identification code, user identification code, user enrollment data (e.g., scanned fingerprint or other biometric data) protected by the authentication device, and keys wrapped by the authentication device used to perform the secure authentication techniques described herein. For example, as discussed in detail below, a unique key may be stored into each of the authentication devices and used when communicating to servers 130 over a network such as the Internet.

As discussed below, certain types of network transactions are supported by the secure transaction plugin 105 such as HTTP or HTTPS transactions with websites 131 or other servers. In one embodiment, the secure transaction plugin is initiated in response to specific HTML tags inserted into the HTML code of a web page by the web server 131 within the secure enterprise or Web destination 130 (sometimes simply referred to below as "server 130"). In response to detecting such a tag, the secure transaction plugin 105 may forward transactions to the secure transaction service 101 for processing. In addition, for certain types of transactions (e.g., such as secure key exchange) the secure transaction service 101 may open a direct communication channel with the on-premises transaction server 132 (i.e., co-located with the website) or with an off-premises transaction server 133.

The secure transaction servers 132-133 are coupled to a secure transaction database 120 for storing user data, authentication device data, keys and other secure information needed to support the secure authentication transactions described below. It should be noted, however, that the underlying principles of the invention do not require the separation of logical components within the secure enterprise or web destination 130 shown in FIG. 1A. For example, the website 131 and the secure transaction servers 132-133 may be implemented within a single physical server or separate physical servers. Moreover, the website 131 and transaction servers 132-133 may be implemented within an integrated software module executed on one or more servers for performing the functions described below.

As mentioned above, the underlying principles of the invention are not limited to a browser-based architecture shown in FIG. 1A. FIG. 1B illustrates an alternate implementation in which a stand-alone application 154 utilizes the functionality provided by the secure transaction service 101 to authenticate a user over a network. In one embodiment, the application 154 is designed to establish communication sessions with one or more network services 151 which rely on the secure transaction servers 132-133 for performing the user/client authentication techniques described in detail below.

In either of the embodiments shown in FIGS. 1A-B, the secure transaction servers 132-133 may generate the keys which are then securely transmitted to the secure transaction service 101 and stored into the authentication devices within the secure storage 120. Additionally, the secure transaction servers 132-133 manage the secure transaction database 120 on the server side.

Device Registration and Transaction Confirmation

One embodiment of the invention employs secure transaction confirmation techniques during registration. As such, various registration and secure transaction operations will initially be described with respect to FIGS. 2-5, followed by a detailed description of embodiments of the invention for secure registration of authentication devices.

FIG. 2 illustrates a series of transactions for registering authentication devices. During registration, a key is shared between the authentication device and one of the secure transaction servers 132-133. The key is stored within the secure storage 120 of the client 100 and the secure transaction database 120 used by the secure transaction servers 132-133. In one embodiment, the key is a symmetric key generated by one of the secure transaction servers 132-133. However, in another embodiment discussed below, asymmetric keys may be used. In this embodiment, the public key may be stored by the secure transaction servers 132-133 and a second, related private key may be stored in the secure storage 120 on the client. Moreover, in another embodiment, the key(s) may be generated on the client 100 (e.g., by the authentication device or the authentication device interface rather than the secure transaction servers 132-133). The underlying principles of the invention are not limited to any particular types of keys or manner of generating the keys.

A secure key provisioning protocol such as the Dynamic Symmetric Key Provisioning Protocol (DSKPP) may be used to share the key with the client over a secure communication channel (see, e.g., Request for Comments (RFC) 6063). However, the underlying principles of the invention are not limited to any particular key provisioning protocol.

Turning to the specific details shown in FIG. 2, once the user enrollment or user verification is complete, the server 130 generates a randomly generated challenge (e.g., a cryptographic nonce) that must be presented by the client during device registration. The random challenge may be valid for a limited period of time. The secure transaction plugin detects the random challenge and forwards it to the secure transaction service 101. In response, the secure transaction service initiates an out-of-band session with the server 130 (e.g., an out-of-band transaction) and communicates with the server 130 using the key provisioning protocol. The server 130 locates the user with the user name, validates the random challenge, validates the device's authentication code if one was sent, and creates a new entry in the secure transaction database 120 for the user. It may also generate the key, write the key to the database 120 and send the key back to the secure transaction service 101 using the key provisioning protocol. Once complete, the authentication device and the server 130 share the same key if a symmetric key was used or different keys if asymmetric keys were used.

Figure 3A:
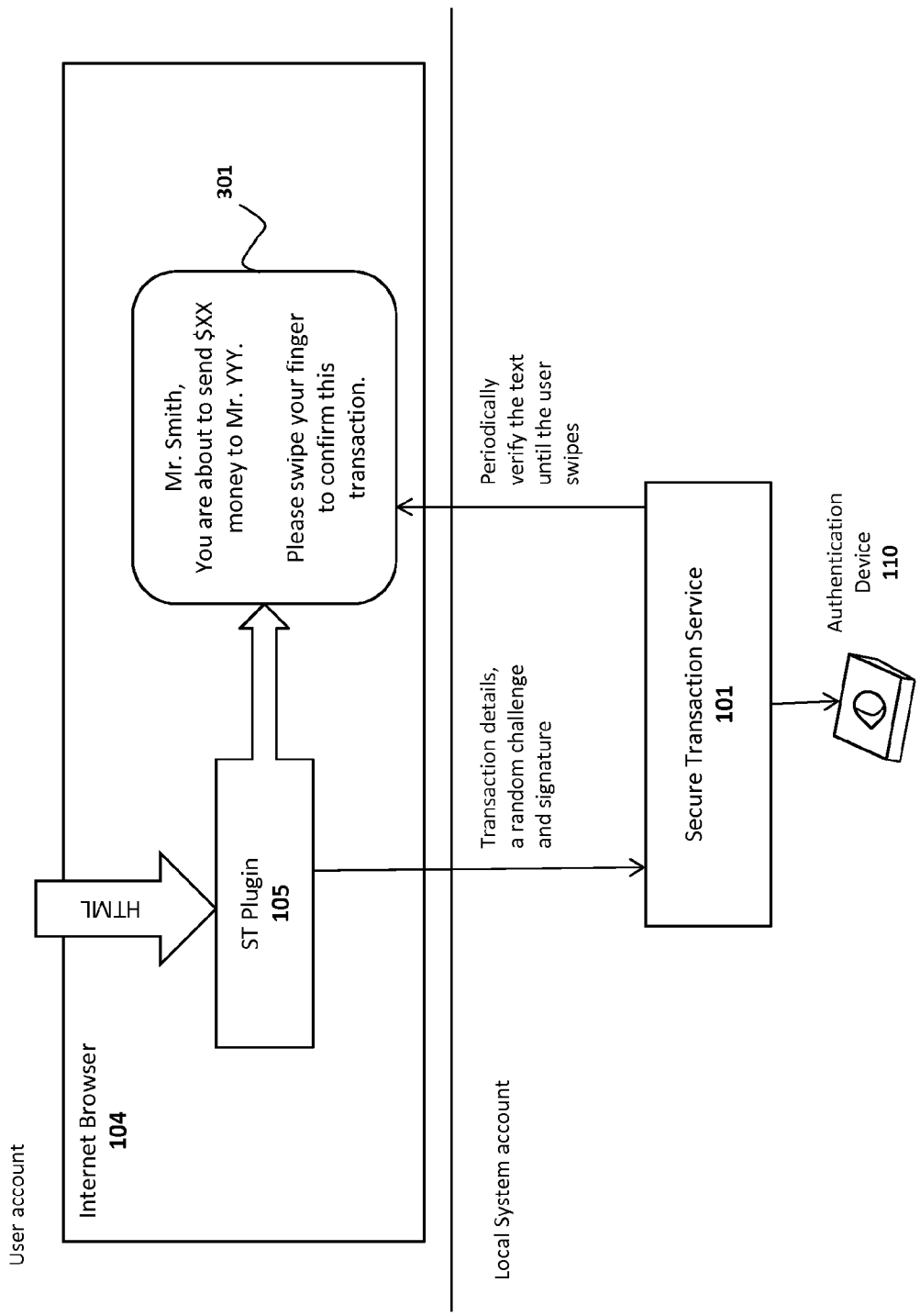
FIGS. 3A-B illustrates embodiments for secure transaction confirmation using a secure display.

FIG. 3A illustrates a secure transaction confirmation for a browser-based implementation. While a browser-based implementation is illustrated, the same basic principles may be implemented using a stand-alone application or mobile device app.

The secure transaction confirmation is designed to provide stronger security for certain types of transactions (e.g., financial transactions). In the illustrated embodiment, the user confirms each transaction prior to committing the transaction. Using the illustrated techniques, the user confirms exactly what he/she wants to commit and commits exactly what he/she sees displayed in a window 301 of the graphical user interface (GUI). In other words, this embodiment ensures that the transaction text cannot be modified by a "man in the middle" (MITM) or "man in the browser" (MITB) to commit a transaction which the user did not confirm.

In one embodiment, the secure transaction plugin 105 displays a window 301 in the browser context to show the transaction details. The secure transaction server 101 periodically (e.g., with a random interval) verifies that the text that is shown in the window is not being tampered by anyone. In a different embodiment, the authentication device has a trusted user interface (e.g. providing an API compliant to GlobalPlatform's TrustedUI).

The following example will help to highlight the operation of this embodiment. A user chooses items for purchase from a merchant site and selects "check out." The merchant site sends the transaction to a service provide which has a secure transaction server 132-133 implementing one or more of the embodiments of the invention described herein (e.g., PayPal). The merchant site authenticates the user and completes the transaction.

The secure transaction server 132-133 receives the transaction details (TD) and puts a "Secure Transaction" request in an HTML page and sends to client 100. The Secure Transaction request includes the transaction details and a random challenge. The secure transaction plugin 105 detects the request for transaction confirmation message and forwards all data to the secure transaction service 101. In an embodiment which does not use a browser or plugin, the information may be sent directly from the secure transaction servers to the secure transaction service on the client 100.

For a browser-based implementation, the secure transaction plugin 105 displays a window 301 with transaction details to the user (e.g. in a browser context) and asks the user to provide authentication to confirm the transaction. In an embodiment which does not use a browser or plugin, the secure transaction service 101, the application 154 (FIG. 1B), or the authentication device 110 may display the window 301. The secure transaction service 101 starts a timer and verifies the content of the window 301 being displayed to the user. The period of verification may be randomly chosen. The secure transaction service 101 ensures that user sees the valid transaction details in the window 301 (e.g., generating a hash on the details and verifying that the contents are accurate by comparing against a hash of the correct contents). If it detects that the content has been tampered with it prevents the confirmation token/signature from being generated.

After the user provides valid verification data (e.g. by, swiping a finger on the fingerprint sensor), the authentication device verifies the user and generates a cryptographic signature (sometimes referred to as a "token") with the transaction details and the random challenge (i.e., the signature is calculated over the transaction details and the nonce). This allows the secure transaction server 132-133 to ensure that the transaction details have not been modified between the server and the client. The secure transaction service 101 sends the generated signature and username to the secure transaction plugin 105 which forwards the signature to the secure transaction server 132-133. The secure transaction server 132-133 identifies the user with the username and verifies the signature. If verification succeeds, a confirmation message is sent to the client and the transaction is processed.

One embodiment of the invention implements a query policy in which a secure transaction server transmits a server policy to the client indicating the authentication capabilities accepted by the server. The client then analyzes the server policy to identify a subset of authentication capabilities which it supports and/or which the user has indicated a desire to use. The client then registers and/or authenticates the user using the subset of authentication tokens matching the provided policy. Consequently, there is a lower impact to the client's privacy because the client is not required to transmit exhaustive information about its authentication capabilities (e.g., all of its authentication devices) or other information which might be used to uniquely identify the client.

By way of example, and not limitation, the client may include numerous user verification capabilities such as a fingerprint sensor, voice recognition capabilities, facial recognition capabilities, eye/optical recognition capabilities, PIN verification, to name a few. However, for privacy reasons, the user may not wish to divulge the details for all of its capabilities to a requesting server. Thus, using the techniques described herein, the secure transaction server may transmit a server policy to the client indicating that it supports, for example, fingerprint, optical, or smartcard authentication. The client may then compare the server policy against its own authentication capabilities and choose one or more of the available authentication options.

One embodiment of the invention employs transaction signing on the secure transaction server so that no transaction state needs to be maintained on the server to maintain sessions with clients. In particular, transaction details such as transaction text displayed within the window 301 may be sent to the client signed by the server. The server may then verify that the signed transaction responses received by the client are valid by verifying the signature. The server does not need to persistently store the transaction content, which would consume a significant amount of storage space for a large number of clients and would open possibility for denial of service type attacks on server.

Figure 3B:
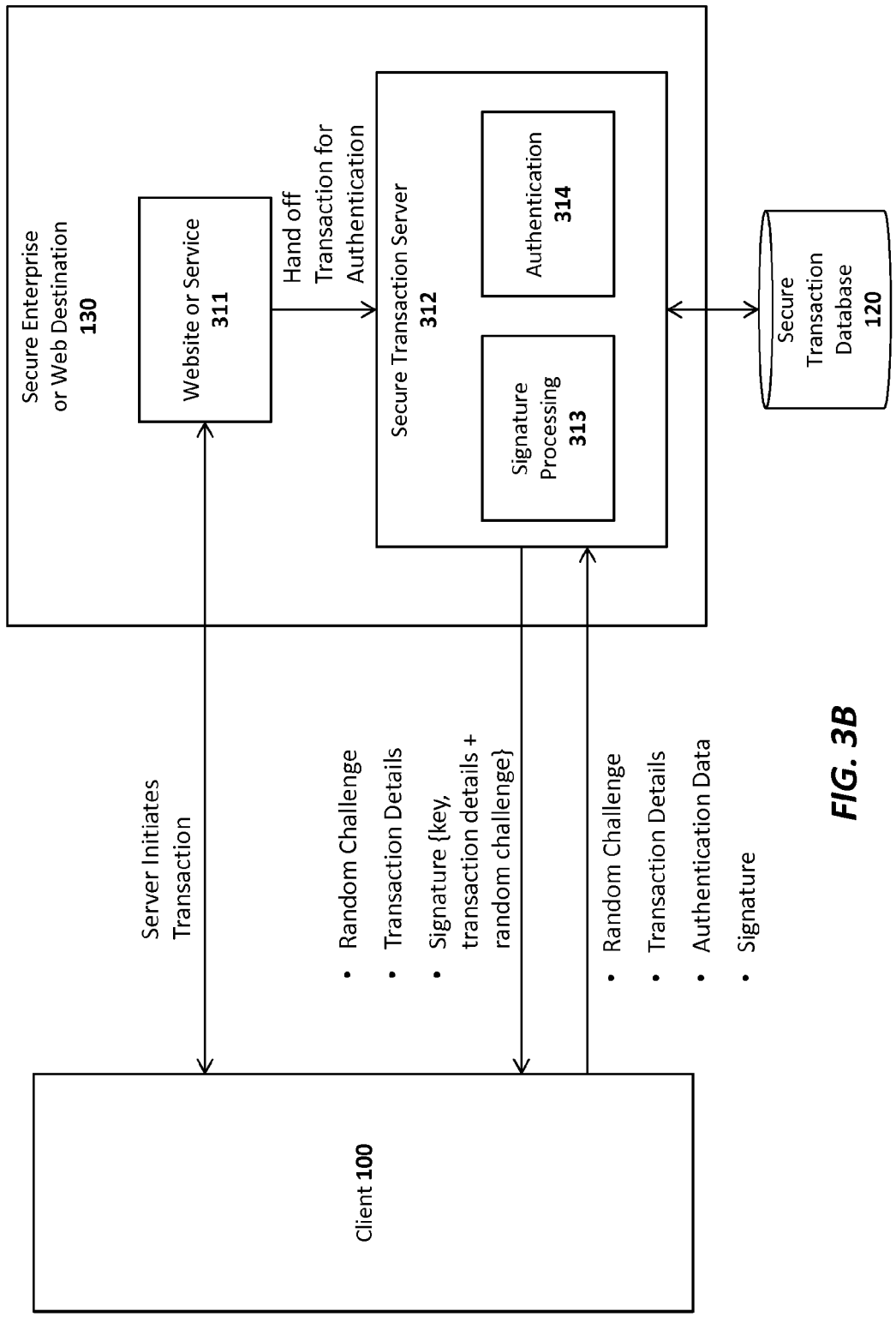

One embodiment of the invention is illustrated in FIG. 3B which shows a website or other network service 311 initiating a transaction with a client 100. For example, the user may have selected items for purchase on the website and may be ready to check out and pay. In the illustrated example, the website or service 311 hands off the transaction to a secure transaction server 312 which includes signature processing logic 313 for generating and verifying signatures (as described herein) and authentication logic for performing client authentication 314 (e.g., using the authentication techniques previously described).

In one embodiment, the authentication request sent from the secure transaction server 312 to the client 100 includes the random challenge such as a cryptographic nonce (as described above), the transaction details (e.g., the specific text presented to complete the transaction), and a signature generated by the signature processing logic 313 over the random challenge and the transaction details using a private key (known only by the secure transaction server).

Once the above information is received by the client, the user may receive an indication that user verification is required to complete the transaction. In response, the user may, for example, swipe a finger across a fingerprint scanner, snap a picture, speak into a microphone, or perform any other type of authentication permitted for the given transaction. In one embodiment, once the user has been successfully verified by the authentication device 110, the client transmits the following back to the server: (1) the random challenge and transaction text (both previously provided to the client by the server), (2) authentication data proving that the user successfully completed authentication, and (3) the signature.

The authentication module 314 on the secure transaction server 312 may then confirm that the user has correctly authenticated and the signature processing logic 313 re-generates the signature over the random challenge and the transaction text using the private key. If the signature matches the one sent by the client, then the server can verify that the transaction text is the same as it was when initially received from the website or service 311. Storage and processing resources are conserved because the secure transaction server 312 is not required to persistently store the transaction text (or other transaction data) within the secure transaction database 120.

Figure 4:
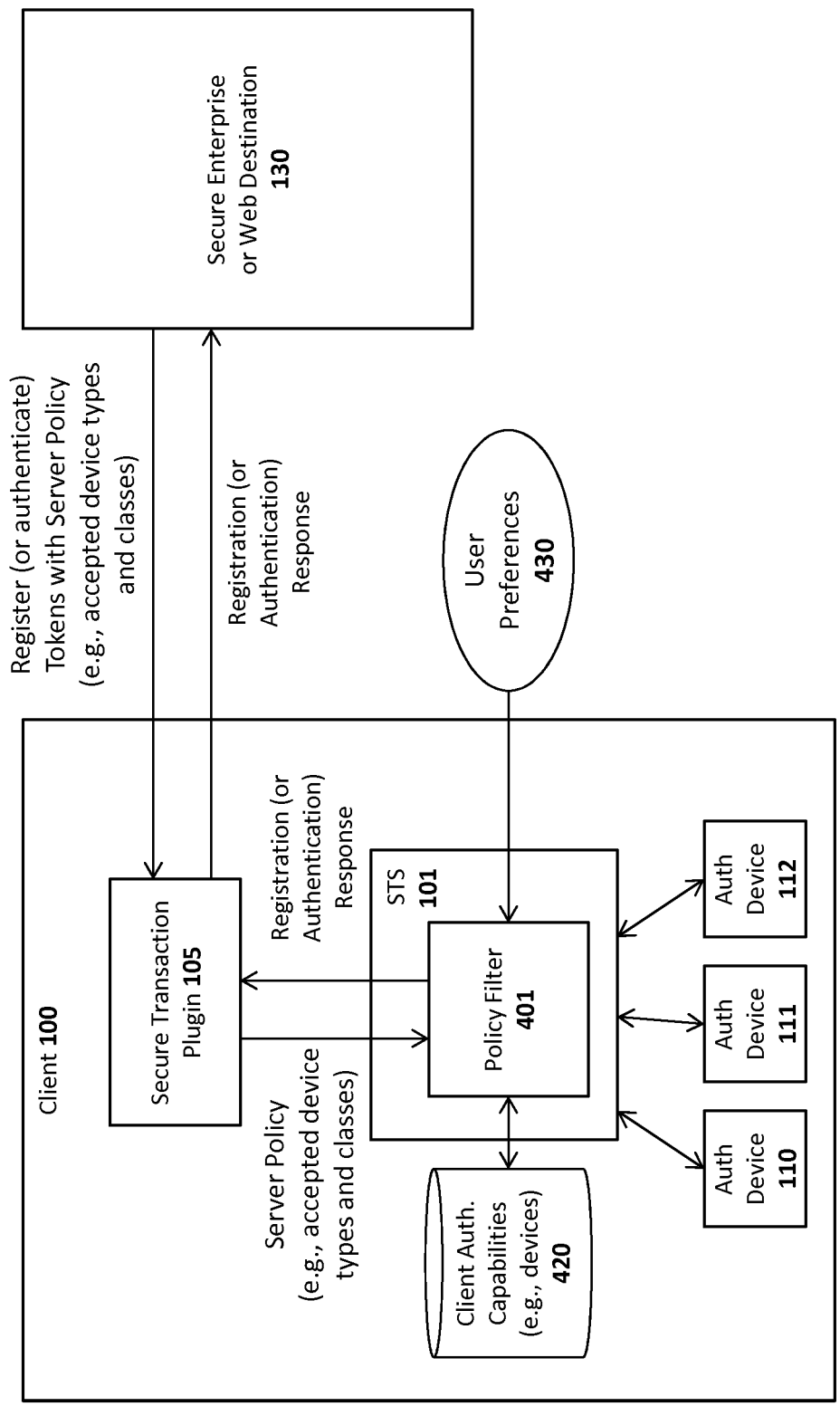
FIG. 4 illustrate one embodiment of the invention for registering with a relying party.

FIG. 4 illustrates one embodiment of a client-server architecture for implementing these techniques. As illustrated, the secure transaction service 101 implemented on the client 100 includes a policy filter 401 for analyzing the policy provided by the server 130 and identifying a subset of authentication capabilities to be used for registration and/or authentication. In one embodiment, the policy filter 401 is implemented as a software module executed within the context of the secure transaction service 101. It should be noted, however, that the policy filter 401 may be implemented in any manner while still complying with the underlying principles of the invention and may include software, hardware, firmware, or any combination thereof.

The particular implementation shown in FIG. 4 includes a secure transaction plugin 105 for establishing communication with the secure enterprise or Web destination 130 (sometimes referred to simply as "server 130" or "relying party" 130) using techniques previously discussed. For example, the secure transaction plugin may identify a specific HTML tag inserted into the HTML code by a web server 131. Thus, in this embodiment, the server policy is provided to the secure transaction plugin 105 which forwards it to the secure transaction service 101 implementing the policy filter 401.

The policy filter 401 may determine the client authentication capabilities by reading the capabilities from the client's secure storage area 420. As previously discussed, the secure storage 420 may comprise a repository of all of the client's authentication capabilities (e.g., identification codes for all of the authentication devices). If the user has already enrolled the user with its authentication devices, the user's enrollment data is stored within the secure storage 420. If the client has already registered an authentication device with a server 130, then the secure storage may also store an encrypted secret key associated with each authentication device.

Using the authentication data extracted from the secure storage 420 and the policy provided by the server, the policy filter 401 may then identify a subset of authentication capabilities to be used. Depending on the configuration, the policy filter 401 may identify a complete list of authentication capabilities supported by both the client and the server or may identify a subset of the complete list. For example, if the server supports authentication capabilities A, B, C, D, and E and the client has authentication capabilities A, B, C, F, and G, then the policy filter 401 may identify the entire subset of common authentication capabilities to the server: A, B, and C. Alternatively, if a higher level of privacy is desired, as indicated by user preferences 430 in FIG. 4, then a more limited subset of authentication capabilities may be identified to the server. For example, the user may indicate that only a single common authentication capability should be identified to the server (e.g., one of A, B or C). In one embodiment, the user may establish a prioritization scheme for all of the authentication capabilities of the client 100 and the policy filter may select the highest priority authentication capability (or a prioritized set of N authentication capabilities) common to both the server and the client.

Depending on what operation has been initiated by server 130 (Registration or Authentication), the secure transaction service 130 performs that operation on the filtered subset of authentication devices (110-112) and sends the operation response back to server 130 via the secure transaction plugin 105 as shown in FIG. 4. Alternatively, in an embodiment which does not rely on a plugin 105 component of a Web browser, the information may be passed directly from the secure transaction service 101 to the server 130.

Figure 5:
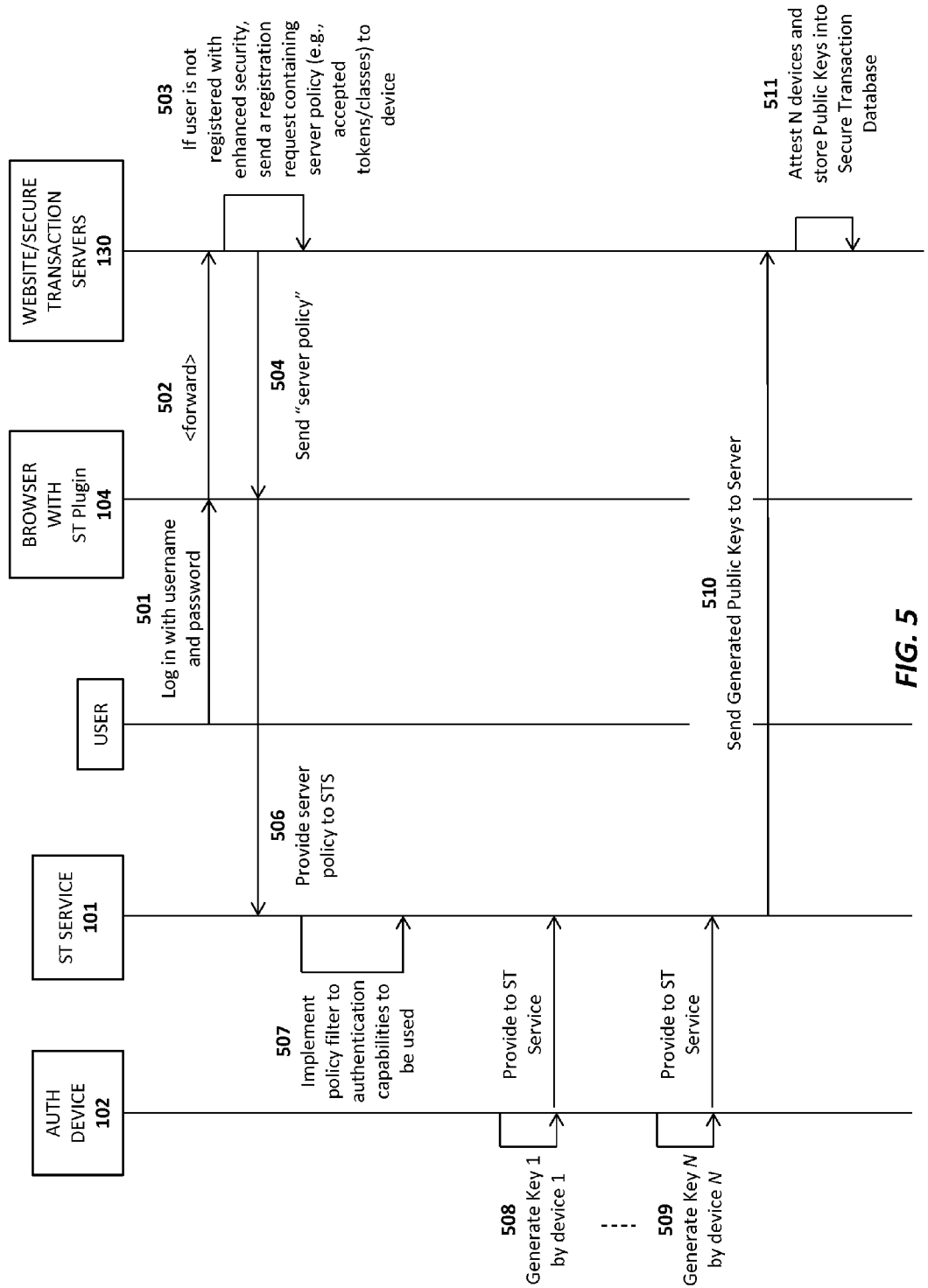
FIG. 5 illustrates a transaction diagram showing how a registration operation with query policy is implemented in one embodiment of the invention.

FIG. 5 illustrates a transaction diagram showing additional details for an exemplary series of registrations with query policy transactions. In the illustrated embodiment, the user has not previously registered devices with the server 130. Consequently, at 501 the user may enter a user name and password as an initial, one-time authentication step, which is forwarded at 502 to the server 130 via the client browser 104. It should be noted, however, that a user name and password are not required for complying with the underlying principles of the invention.

Because the user has not previously registered with enhanced security, determined at 503, the server 130 transmits its server policy to the client at 504. As mentioned, the server policy may include an indication of the authentication capabilities supported by the server 130. In the illustrated example, the server policy is passed to the secure transaction service 101 via transaction 506.

At transaction 507, the secure transaction service 101 compares the server policy with the capabilities of the client (and potentially other information such as device priority scheme and/or user preferences as described above) to arrive at a filtered list of authentication capabilities. The filtered list of devices (102) then generate key pairs at transactions 508 and 509, and provide the public portions of these key pairs to secure transaction service 101 which, in turn, sends these as registration response back to server 130 at 510. The server attests the authentication devices and stores public keys in secure transaction database. The Token Attestation employed here is the process of validating authentication device identity during registration. It allows the server 130 to cryptographically ensure that the device reported by the client is really who it claimed to be.

Alternatively, or in addition, at 507, the user may be provided with an opportunity to review the list and/or select specific authentication capabilities to be used with this particular server 130. For example, the filtered list may indicate the option to use authentication with a fingerprint scan, facial recognition, and/or voice recognition. The user may then choose to use one or more of these options when authenticating with the server 130.

The techniques described above for filtering a server policy at a client may be implemented at various different stages of the series of transactions described above (e.g., during device discovery, device registration, device provisioning, user authentication, etc). That is, the underlying principles of the invention are not limited to the specific set of transactions and the specific transaction ordering set forth in FIG. 5.

Moreover, as previously mentioned, a browser plugin architecture is not required for complying with the underlying principles of the invention. For an architecture which does involve a browser or browser plug-ins (e.g., such as a stand-alone application or mobile device app), the transaction diagram shown in FIG. 5 (and the rest of the transaction diagrams disclosed herein) may be simplified such that the browser 104 is removed, and the secure transaction service 101 communicates directly with the server 130.

Device Registration with Enhanced Security

Various organizations including the European Central Bank (ECB) and Federal Financial Institutions Examination Council (FFIEC) recommend the use of strong authentication for financial transactions. Moreover, the European Network and Information Security Agency (ENISA) has recently proposed that financial institutions should treat all customer devices as compromised. While the secure transaction confirmation method as described above provides sufficient protection even in the case of compromised clients (as long as the authentication device is not compromised), the registration techniques described above for registering authentication devices over a network—even though they are generally secure—do not operate under the assumption that the client device has been compromised and may therefore be vulnerable to malware on the device.

To enhance security during device registration, one embodiment of the invention includes uses an out-of-band communication channel to send a secret code from the relying party to the user or from the user to the relying party. This out-of-band communication channel is used only once to register an authenticator. The authenticator can then be used for subsequent authentication or transaction confirmation steps without requiring the use of this channel. In addition, secure transaction confirmation techniques including the use of a secure display may be used (e.g., such as described above with respect to FIGS. 3A-B) to allow the user to confirm the secret code sent via the out-of-band transmission.

Figure 6:
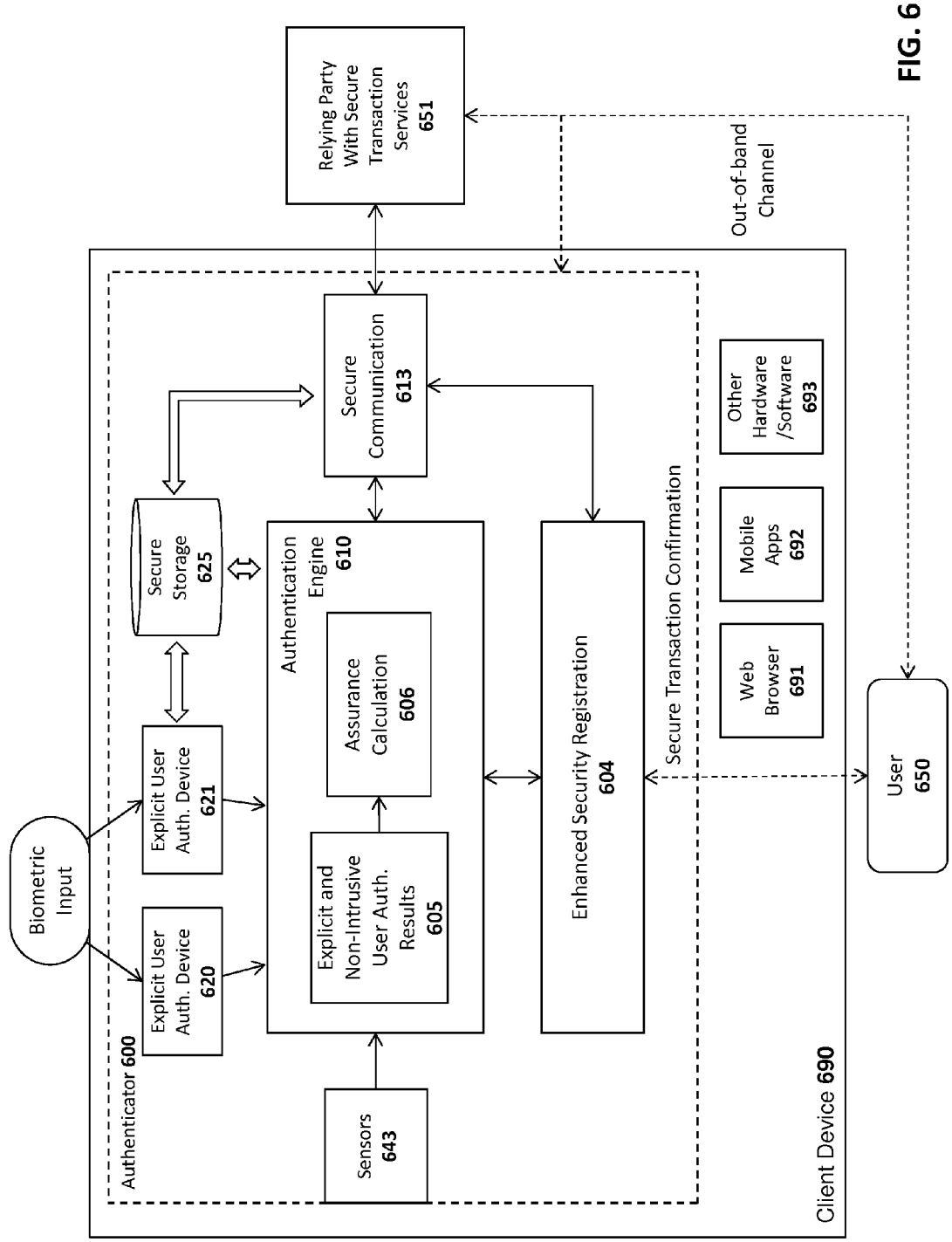
FIG. 6 illustrates one embodiment of an architecture for registration with enhanced security.

FIG. 6 illustrates an exemplary client device 690 either including an authenticator 600 or connected to the authenticator 600 which includes an enhanced security registration module 604 for implementing the enhanced security techniques described herein. The illustrated embodiment also includes an authentication engine 610 with an assurance calculation module 606 for generating an assurance level that the legitimate user is in possession of the client device 600. For example, explicit and non-intrusive authentication results 605 are gathered using explicit user authentication devices 620-621, one or more sensors 643 (e.g., location sensors, accelerometers, etc), and other data related to the current authentication state of the client device 600 (e.g., such as the time since the last explicit authentication).

Explicit authentication may be performed, for example, using biometric techniques (e.g., swiping a finger on a fingerprint authentication device) and/or by the user entering a secret code. Non-intrusive authentication techniques may be performed based on data such as the current detected location of the client device 600 (e.g., via a GPS sensor), other sensed user behavior (e.g., measuring the gait of the user with an accelerometer), and/or variables such as the time since the last explicit authentication. Regardless of how the authentication results 605 are generated, the assurance calculation module 606 uses the results to determine an assurance level indicating a likelihood that the legitimate user 650 is in possession of the client device 600. The secure communication module 613 establishes secure communication with the relying party 613 (e.g., using a secure encryption key as discussed herein). Public/private key pairs or symmetric keys may be stored within a secure storage device 625 which may be implemented as a cryptographically secure hardware device (e.g., a security chip) or using any combination of secure hardware and software.

As illustrated in FIG. 6, the client device 690 may include various additional components such as a Web browser 691, various mobile apps 692, and other hardware/software components. In some of the embodiments described herein, the authenticator 600 us assumed to be compromised, thereby necessitating the secure registration techniques described herein. However, this assumption may not have any impact on the remaining hardware/software components of the client device 690 which may operate normally without affecting the underlying principles of the invention.

Figure 7:
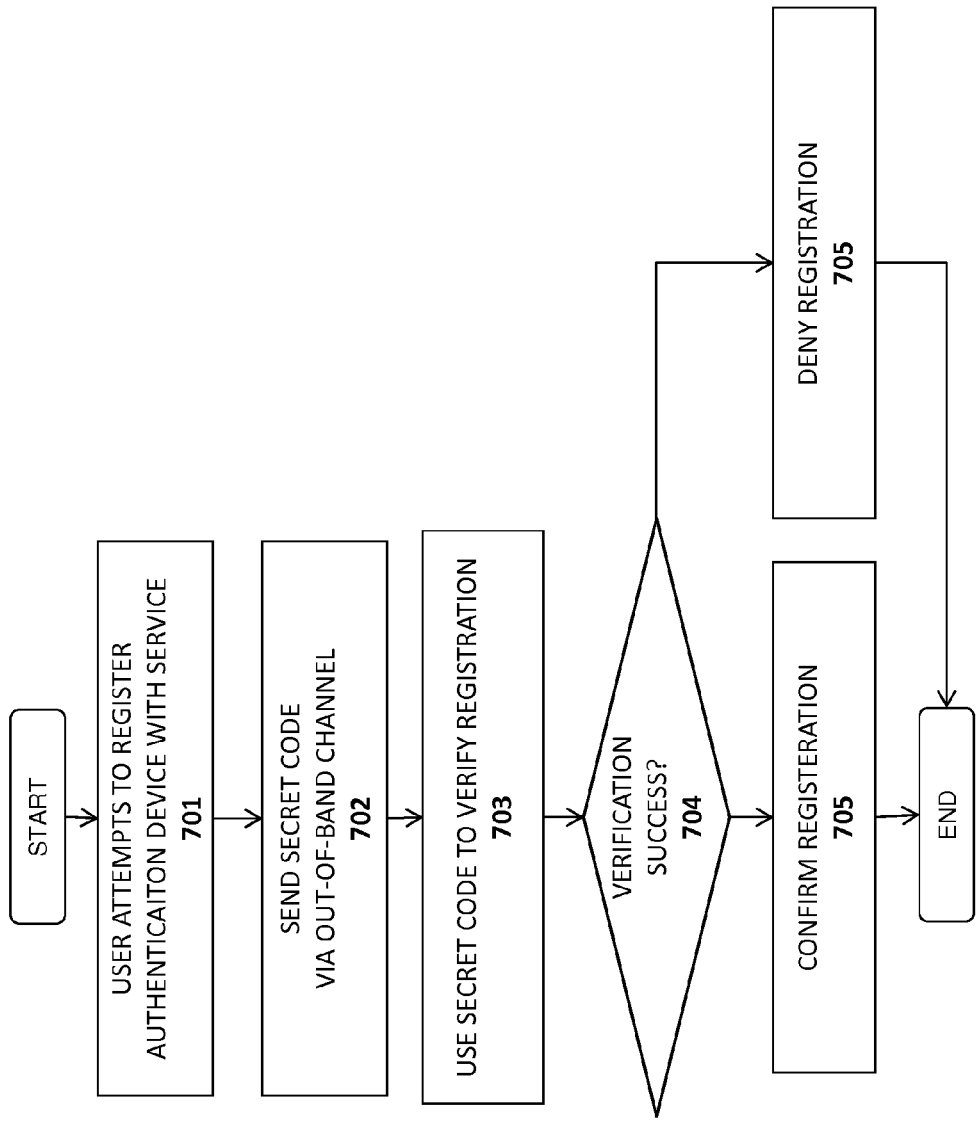
FIG. 7 illustrates one embodiment of a method for secure registration.

One embodiment of a method for performing registration with enhanced security is illustrated in FIG. 7. At 701, a user attempts to register an authentication device with an online service (such as relying party with secure transaction services as described herein). For example, the user may have purchased a new device with new authentication devices/capabilities such as a new fingerprint authenticator. Alternatively, the user may have installed a new authenticator on an existing client device and/or may be accessing the online service for the first time using an existing authenticator.

At 702, in response to the authentication attempt, a secret code is sent from the service to the user or from the user to the service via an out-of-band communication channel. For example, in one embodiment, a hash of the public key generated during the registration process (see, e.g., transaction 510 in FIG. 5) is used to generate the secret code which is then sent via the out-of-band channel. In one particular embodiment, a hash operation such as an SHA-256, SHA-1, or SHA-3 hash operation is applied to the public key to generate a secret code comprising a hash value.

In one embodiment, the secret code is generated by the relying party and sent via an out-of-band channel to the user (e.g., via standard mail or email, etc). In another embodiment, the secret is securely displayed on the client device using a secure transaction confirmation operation; the user may then copy the securely-displayed secret code (e.g., the hash of the public key) and send it to the relying party via the out-of-band communication channel.

Various different types of out-of-band channels may be employed. As used herein, an "out-of-band" channel is a different type of communication channel than that used for standard registration and authentication. In one embodiment, the out-of-band channel comprises non-electronic mail. For example, the relying party may mail the hash value to the known address of the user using a postal service. In another embodiment, the out-of-band channel may comprise an electronic channel such as email, text messaging (e.g., short message service (SMS)), instant messaging, or any other type of communication channel using a destination address associated with the user known at the relying party.

Regardless of which out-of-band channel is used, at 703, the secret code (e.g., the public key hash received through the out-of-band channel) is used to verify the registration. For example, in an embodiment in which a public key hash was securely displayed on the client, the user submits the public key hash displayed on the secure display over the out-of-band channel. In an embodiment in which the code is sent from the relying party to the client over an out-of-band channel, the user may confirm the secret code on the client (e.g., via a secure transaction confirmation operation). In one embodiment, the secure transaction confirmation techniques described herein (see, e.g., FIGS. 3A-B and associated text) may be used to securely display the public key hash on the display for the user's verification and/or to allow the user to copy the public key hash and send it back to the relying party via the out-of-band channel.

If the verification is successful, determined at 704 (e.g., if the public key hash received as part of the registration 701 matches the public key hash sent via the out-of-band channel), then registration is confirmed at 705. If, however, the public key hash doesn't match, or if a threshold amount of time passes before the public key hash is received via out-of-band channel, then registration is denied at 706.

In one embodiment, various other data may be displayed for the user to verify during the registration process. For example, in one embodiment, a unique code associated with the user's account on the relying party is also displayed using the transaction confirmation and secure display techniques (and verified by the user). This unique code associating the user with the relying party is sometimes referred to herein as an "AppID." In some embodiments, where a relying party offers multiple online services, a user may have multiple AppIDs with a single relying party (one for each service offered by the relying party).

Various different implementations may be employed including a post-registration embodiment in which the user is known to the relying party ahead of time, a pre-registration embodiment in which the user registers with the relying party before the relying party identifies the user (e.g., according to the respective Know-Your-Customer (KYC) rules), and hybrid embodiments which involve quasi-simultaneous registration (e.g., using an existing code known by both the user and the relying party).

1. Post-Registration

FIG. 8A illustrates one embodiment of a post-registration process in which the user is known to the relying party. For example, the user may have been previously identified by the relying party according to know your customer (KYC) rules before the user performs registration. At 801, the user is identified by the relying party (e.g., using KYC) and the relying party creates an electronic record for this user in its database.

At 802, the user visits the relying party's web site and the relying party's web application detects that the user's device is equipped with enhanced authentication capabilities (e.g., such as those described herein for remote authentication over a network).

At 803, the user initiates registration with the relying party. For example, a series of transactions such as shown in FIG. 5 may be performed to generate a public/private key pair for the authenticator. At 804, the relying party sends a secret (e.g., the hash of the registered public key) to the user using an out-of-band method (e.g., postal mail, electronic mail, SMS, etc).

At 805, the relying party triggers a secure transaction confirmation operation. For example, in one embodiment, a message may be displayed to the user with the secret and potentially the unique account ID code, asking the user to confirm the information (e.g., "I confirm the public key hash received through the out-of-band method is identical to the one displayed at this time on my secure display and it was registered to the AppID shown there"). At 806, the user may then accept the transaction if the secret and ID code match what is displayed within the secure display, thereby confirming the registration at 807. If the user rejects the transaction at 806 (e.g., because the information displayed does not match the secret and/or ID code), then the registration is denied at 808.

FIG. 8B illustrates another embodiment of a post-registration process in which the user is known to the relying party. Once again, the user may have been previously identified by the relying party according to know your customer (KYC) rules before the user performs registration. At 811, the user is identified by the relying party (e.g., using KYC) and the relying party creates an electronic record for this user in its database.

At 812, the user visits the relying party's web site and the relying party's web application detects that the user's device is equipped with enhanced authentication capabilities (e.g., such as those described herein for remote authentication over a network).

At 813, the user accepts registration with the relying party. For example, a series of transactions such as shown in FIG. 5 may be performed to generate a public/private key pair for the authenticator. At 804, the relying party triggers a secure transaction confirmation operation. For example, in one embodiment, a message may be displayed to the user potentially with the unique account ID code, asking the user to confirm the information (e.g., "I confirm registration and will send signed the public key hash shown below via an authenticated out-of-band channel").

At 815, the user transfers the public key hash shown on the secure display via an authenticated out-of-band channel (e.g. a signed letter). At 816, the relying party verifies the public key hash sent in 815 with the public key hash received in step 813 and might accept the registration at 817. If the values don't match the relying party rejects the registration at 818

2. Pre-Registration

FIG. 9 illustrates one embodiment of a process in which the User performs the registration to the relying party before the relying party identifies the user (e.g., according to the respective KYC rules). At 901, the user visits the relying party's web site and the relying party's web application detects that the user's device is equipped with enhanced authentication capabilities (e.g., such as those described herein for remote authentication over a network).

At 902, the user initiates registration with the relying party. For example, a series of transactions such as shown in FIG. 5 may be performed to generate a public/private key pair for the authenticator. At 903, the relying party triggers a transaction confirmation operation for the registration request. For example, a message may be displayed in the secure display requesting confirmation that the user wishes to register at the relying party (e.g., "I want to register at <relying party> and will undergo KYC later"). In addition, the secure display may display the code (e.g., a hash of the public key) and the AppID. Note that this code may or may not be a "secret" code.

At 904, the user sends the code to the relying party using an authenticated out-of-band mechanism. For example, in one embodiment, the user may physically bring a printout of the hash to a branch office of the relying party shows it as part of the KYC confirmation. Alternatively the user may enter the code into a form which is part of the identification procedure. Alternatively, the user may send the secret via email, postal mail, SMS or any other type of authenticated out-of band channel.

At 905, the relying party performs a verification of the code (e.g., comparing the public key hash to the hash value computed on the public key received during registration from that user). If a match is confirmed at 906, then the registration is confirmed at 907. If a match is not confirmed, then registration is denied at 908.

3. Quasi Simultaneous Registration

Some users already have credentials such as an electronic ID card with an Identity Certificate on it. Using this Identity certificate the out-of-band method can be replaced by an electronic method using the electronic ID card as illustrated in FIG. 10.

At 1001, the user visits relying party's web site and the relying party's web application detects that the user's device is equipped with enhanced authentication capabilities (e.g., such as those described herein for remote authentication over a network).

At 1002, the user accepts registration with the relying party. For example, a series of transactions such as shown in FIG. 5 may be performed to generate a public/private key pair for the authenticator. At 1003, the relying party triggers a transaction confirmation operation for the registration request. For example, the secure display of the transaction confirmation may display a message requesting confirmation that the user wishes to register at the relying party using existing credentials (e.g., "I want to register at <relying party> and will use an identification based on my eID card"). In addition, the secure display may display to the user the secret (e.g., a hash of the public key) and the AppID.

At 1004, the user creates an authentication object (e.g., a document or binary file) including the AppID and the hash of the public key, signs this object using the private key related to the existing credentials (e.g., the Identity Certificate on the user's electronic ID card). At 1005, the relying party verifies the signed object and extracts the Identity Data from the credentials (e.g., the Identity Certificate). In addition, the relying party compares this public key hash extracted from the signed object to the hash value computed on the public key received during registration from that user. If they match, determined at 1006, then the registration is confirmed at 1007. If not, then registration is denied at 1008.

Exemplary Data Processing Devices

Figure 11:
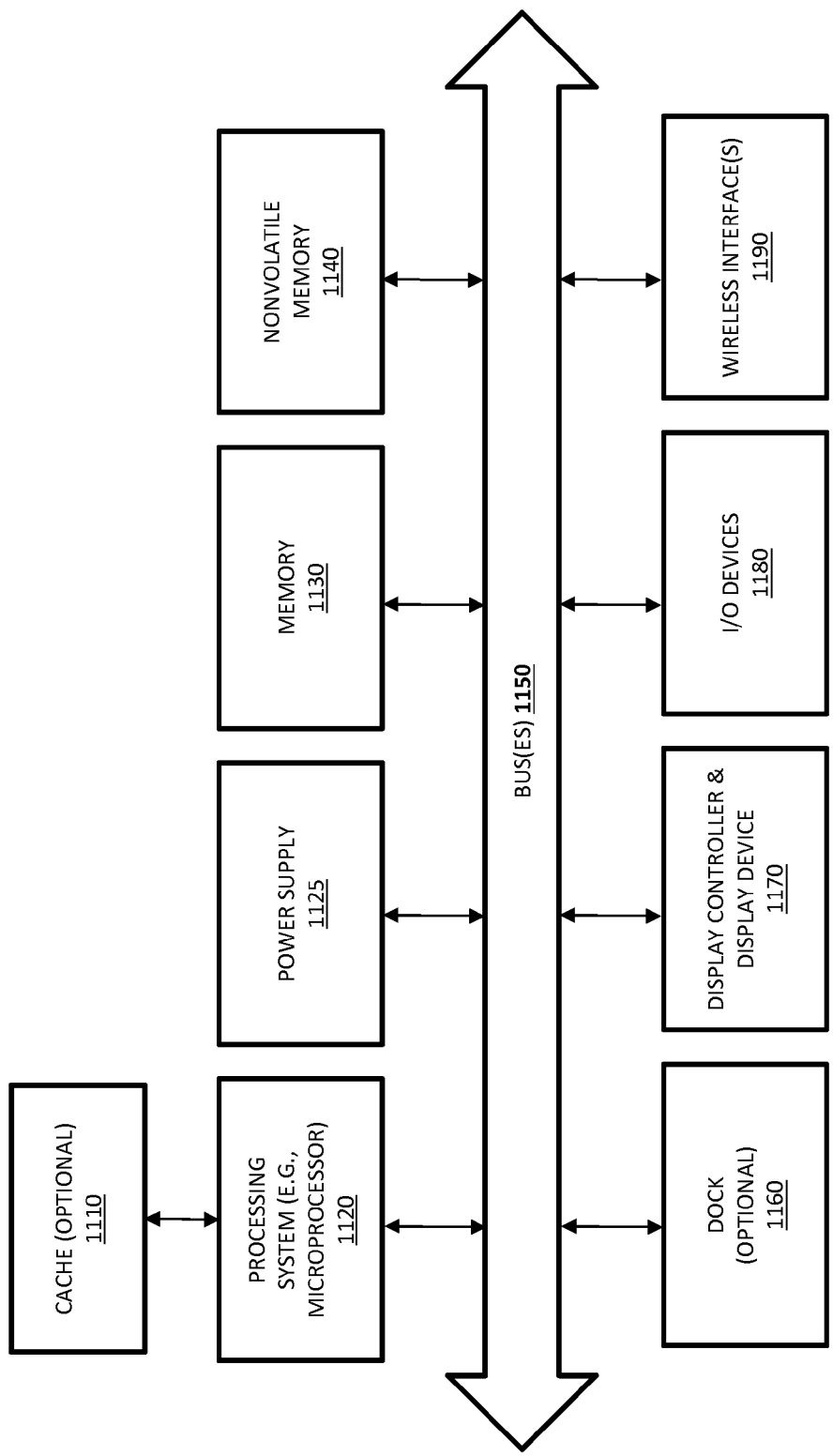
FIGS. 11-12 illustrate exemplary embodiments of a computer system for executing embodiments of the invention.

FIG. 11 is a block diagram illustrating an exemplary clients and servers which may be used in some embodiments of the invention. It should be understood that while FIG. 11 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 11, the computer system 1100, which is a form of a data processing system, includes the bus(es) 1150 which is coupled with the processing system 1120, power supply 1125, memory 1130, and the nonvolatile memory 1140 (e.g., a hard drive, flash memory, Phase-Change Memory (PCM), etc.). The bus(es) 1150 may be connected to each other through various bridges, controllers, and/or adapters as is well known in the art. The processing system 1120 may retrieve instruction(s) from the memory 1130 and/or the nonvolatile memory 1140, and execute the instructions to perform operations as described above. The bus 1150 interconnects the above components together and also interconnects those components to the optional dock 1160, the display controller & display device 1170, Input/Output devices 1180 (e.g., NIC (Network Interface Card), a cursor control (e.g., mouse, touchscreen, touchpad, etc.), a keyboard, etc.), and the optional wireless transceiver(s) 1190 (e.g., Bluetooth, WiFi, Infrared, etc.).

Figure 12:
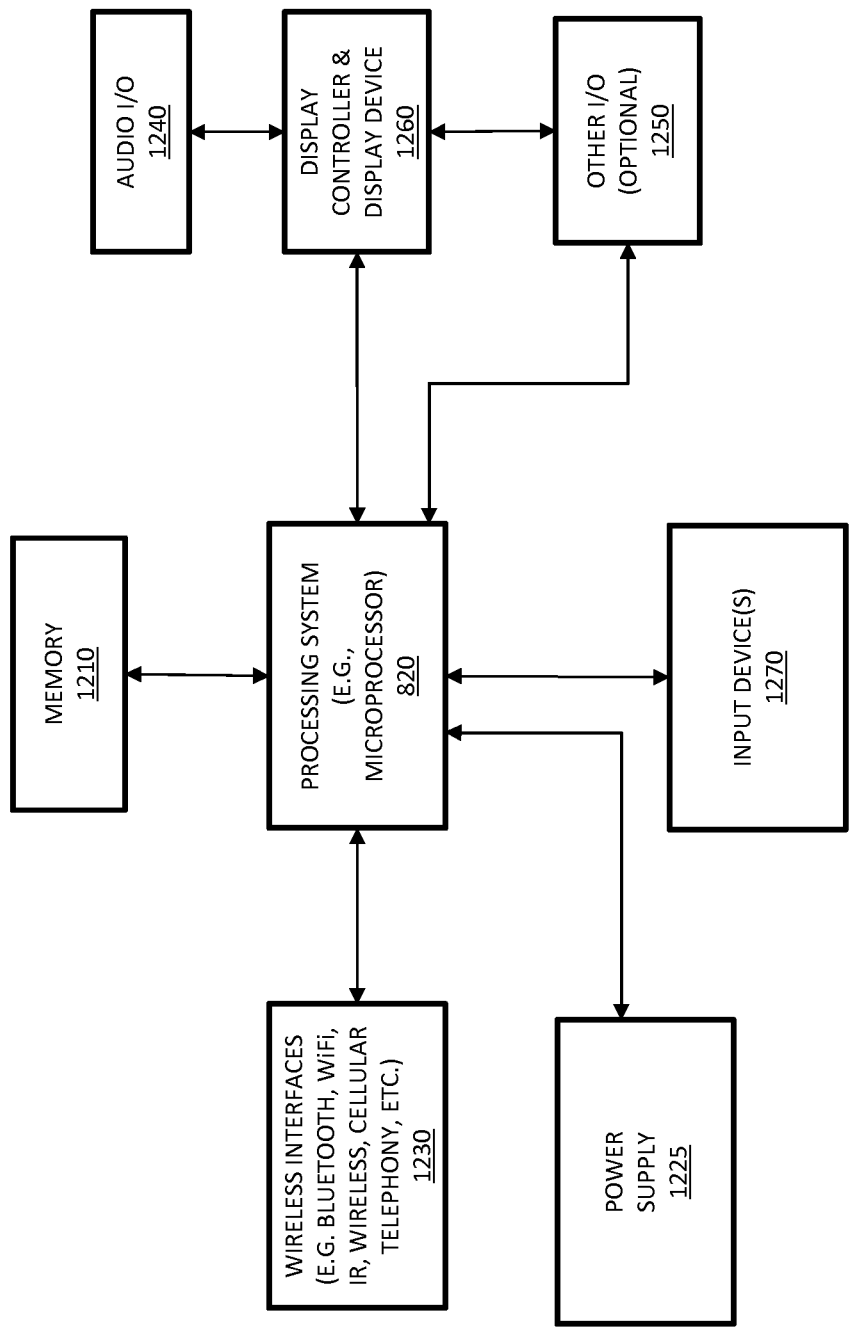

FIG. 12 is a block diagram illustrating an exemplary data processing system which may be used in some embodiments of the invention. For example, the data processing system 1200 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 1200 may be a network computer or an embedded processing device within another device.

According to one embodiment of the invention, the exemplary architecture of the data processing system 1200 may used for the mobile devices described above. The data processing system 1200 includes the processing system 1220, which may include one or more microprocessors and/or a system on an integrated circuit. The processing system 1220 is coupled with a memory 1210, a power supply 1225 (which includes one or more batteries) an audio input/output 1240, a display controller and display device 1260, optional input/output 1250, input device(s) 1270, and wireless transceiver(s) 1230. It will be appreciated that additional components, not shown in FIG. 12, may also be a part of the data processing system 1200 in certain embodiments of the invention, and in certain embodiments of the invention fewer components than shown in FIG. 12 may be used. In addition, it will be appreciated that one or more buses, not shown in FIG. 12, may be used to interconnect the various components as is well known in the art.

The memory 1210 may store data and/or programs for execution by the data processing system 1200. The audio input/output 1240 may include a microphone and/or a speaker to, for example, play music and/or provide telephony functionality through the speaker and microphone. The display controller and display device 1260 may include a graphical user interface (GUI). The wireless (e.g., RF) transceivers 1230 (e.g., a WiFi transceiver, an infrared transceiver, a Bluetooth transceiver, a wireless cellular telephony transceiver, etc.) may be used to communicate with other data processing systems. The one or more input devices 1270 allow a user to provide input to the system. These input devices may be a keypad, keyboard, touch panel, multi touch panel, etc. The optional other input/output 1250 may be a connector for a dock.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

I claim:

1. A method comprising:
receiving a request at a relying party from a user to register an authenticator;
sending a code from the user to the relying party through an authenticated out-of-band communication channel; and
verifying the identity of the user using the code and responsively registering the authenticator with the relying party in response to a positive verification.

2. The method as in claim 1 wherein the verifying the code further comprises:
performing a secure transaction confirmation operation including displaying the code in a secure display of the user's authenticator and asking the user to send the code displayed on the secure display over the authenticated out-of-band communication channel.

3. The method as in claim 2 wherein performing a secure transaction confirmation operation further comprises:
displaying an identification code related to an account of the user associated with the relying party.

4. The method as in claim 2 wherein content displayed within the secure display is protected by generating a hash over the content and providing the resulting hash value to the relying party, the relying party confirming the validity of the content by validating the hash value.

5. The method as in claim 1 wherein the code is a secret code generated by the user's authenticator.

6. The method as in claim 1 further comprising:
in response to the request to register the authenticator, generating a public key associated with the authenticator and transmitting the public key to the relying party.

7. The method as in claim 6 further comprising:
generating the code by performing a hash operation on the public key.

8. The method as in claim 7 wherein the hash operation comprises an SHA-256, SHA-1, or SHA-3 hash operation.

9. The method as in claim 1 wherein the out-of-band communication channel comprises postal mail, electronic mail, or a short message service (SMS) message.

10. The method as in claim 1 wherein the code is extracted from an electronic message authenticated/signed using an electronic identification certificate of the user.

11. A method comprising:
receiving at a relying party a request from a user to register an authenticator;
generating a code by the authenticator;
securely providing the code to the user;
sending the code to the relying party from the user over an authenticated out-of-band communication channel; and
verifying the identity of the user using the code and responsively registering the authenticator in response to a positive verification.

12. The method as in claim 11 wherein securely providing the code to the user comprises:
performing a secure transaction confirmation operation including displaying the code in a secure display of the user's authenticator.

13. The method as in claim 12 wherein performing a secure transaction confirmation operation further comprises:
displaying an identification code related to an account of the user associated with the relying party.

14. The method as in claim 12 wherein content displayed within the secure display is protected by generating a hash over the content and providing the resulting hash value to the relying party, the relying party confirming the validity of the content by validating the hash value.

15. The method as in claim 11 further comprising:
in response to the request to register the authenticator, generating a public key associated with the authenticator and transmitting the public key to the relying party.

16. The method as in claim 15 further comprising:
generating the code by performing a hash operation on the public key.

17. The method as in claim 16 wherein the hash operation comprises an SHA-256, SHA-1, or SHA-3 hash operation.

18. The method as in claim 11 wherein the out-of-band communication channel comprises postal mail, electronic mail, or a short message service (SMS) message.

19. The method as in claim 11 wherein the code is extracted from an electronic message authenticated/signed by the electronic identification certificate of the user.

20. A method comprising:
receiving a request at a relying party from a user to register an authenticator, the request including identification information identifying existing credentials of the user;
creating an authentication object at a client of the user, the authentication object including a signature generated using a private key associated with the existing credentials of the user; and
verifying the signature at the relying party and responsively registering the authenticator in response to a positive verification.

21. The method as in claim 20 further comprising:
generating a public/private key pair associated with the authenticator; and
sending the public key to the relying party.

22. The method as in claim 21 wherein the authentication object comprises an identification code associated with the user's account at the relying party, a hash of the public key generated with the private key, and the signature generated with the private key.

23. The method as in claim 22 wherein verifying the signature comprises comparing the public key hash extracted from the object with the hash value computed on the public key received during registration from the user.

* * * * *